United States Patent
Moore et al.

(10) Patent No.: US 11,797,645 B2
(45) Date of Patent: Oct. 24, 2023

(54) METHOD AND APPARATUS FOR PROCESSING A HISTOGRAM OUTPUT FROM A DETECTOR SENSOR

(71) Applicants: STMicroelectronics (Grenoble 2) SAS, Grenoble (FR); STMICROELECTRONICS (RESEARCH & DEVELOPMENT) LIMITED, Marlow (GB)

(72) Inventors: John Kevin Moore, Edinburgh (GB); Sam Lee, Edinburgh (GB); Pascal Mellot, Lans en Vercors (FR); Donald Baxter, Stirling (GB); Stuart McLeod, Edinburgh (GB); Kenneth Dargan, Edinburgh (GB)

(73) Assignees: STMicroelectronics (Research & Development) Limited, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 32 days.

(21) Appl. No.: 17/410,143

(22) Filed: Aug. 24, 2021

(65) Prior Publication Data
US 2021/0382964 A1 Dec. 9, 2021

Related U.S. Application Data

(63) Continuation of application No. 15/886,353, filed on Feb. 1, 2018, now Pat. No. 11,120,104.

(30) Foreign Application Priority Data

Mar. 1, 2017 (EP) .................................... 17158736
Mar. 1, 2017 (EP) .................................... 17305222
(Continued)

(51) Int. Cl.
*G06F 17/18* (2006.01)
*G01S 7/4863* (2020.01)
(Continued)

(52) U.S. Cl.
CPC ............ *G06F 17/18* (2013.01); *G01S 7/4863* (2013.01); *G01S 7/4865* (2013.01); *G01S 7/4876* (2013.01);
(Continued)

(58) Field of Classification Search
CPC .... G06F 17/18; G06F 11/0703; G01S 7/4863; G01S 7/4865; G01S 7/4876; G01S 17/10;
(Continued)

(56) References Cited

U.S. PATENT DOCUMENTS 5,359,404 A   10/1994  Dunne
6,807,298 B1 * 10/2004  Park .................... G06V 10/507
                                                  382/199
(Continued)

FOREIGN PATENT DOCUMENTS

CN            105378113 A    *  3/2016  ........... C12Q 1/6823
CN   WO 20160154869         * 10/2016  ............... G05D 1/10
(Continued)

OTHER PUBLICATIONS

Massa "Rangefinding using Time Correlated Single Photon Counting", pp. 36-43; 0-8186-7943-3/97 $10.00 0 1997 IEEE (Year: 1997).*

(Continued)

Primary Examiner — Michael J Dalbo
Assistant Examiner — Kaleria Knox
(74) Attorney, Agent, or Firm — Slater Matsil, LLP

(57) ABSTRACT

A method includes receiving a histogram output from a detector sensor, and calculating a median point of a pulse waveform within the histogram. The pulse waveform has an (Continued)

even probability distribution over at least one quantization step of the histogram around the median point. A corresponding apparatus can include a detector sensor and a co-processor coupled to the detector sensor.

20 Claims, 30 Drawing Sheets

(30) Foreign Application Priority Data

Mar. 1, 2017 (EP) .................................. 17305223
Mar. 1, 2017 (EP) .................................. 17305224

(51) Int. Cl.
| | |
|---|---|
| *G06F 11/07* | (2006.01) |
| *G01S 17/10* | (2020.01) |
| *G01S 7/4865* | (2020.01) |
| *G01S 7/487* | (2006.01) |
| *G01S 7/497* | (2006.01) |
| *G01S 7/481* | (2006.01) |

(52) U.S. Cl.
CPC .............. *G01S 7/497* (2013.01); *G01S 17/10* (2013.01); *G06F 11/0703* (2013.01); *G01S 7/4813* (2013.01)

(58) Field of Classification Search
CPC ..... G01S 7/4813; G01S 13/958; G06V 10/44; G06V 10/507; G06V 40/1394; G06T 7/0012; H04N 5/2353; H04N 19/176; G01R 33/56341; G01N 15/1012; G01V 5/0041
See application file for complete search history.

(56) References Cited

U.S. PATENT DOCUMENTS

| | | | | |
|---|---|---|---|---|
| 7,424,148 | B2* | 9/2008 | Goh | G06T 5/009 382/274 |
| 8,811,724 | B2* | 8/2014 | Nielsen | G06T 7/0012 382/128 |
| 2001/0029449 | A1* | 10/2001 | Tsurufuji | G10L 15/20 704/226 |
| 2003/0086596 | A1* | 5/2003 | Hipp | G06T 7/0012 382/128 |
| 2004/0085475 | A1* | 5/2004 | Skow | H04N 5/2353 348/E5.037 |
| 2005/0031201 | A1* | 2/2005 | Goh | G06T 5/009 382/254 |
| 2007/0143081 | A1 | 6/2007 | Goldberg | |
| 2009/0010517 | A1* | 1/2009 | Basser | G01R 33/56341 382/131 |
| 2009/0128810 | A1* | 5/2009 | Bates | G01N 15/1012 356/336 |
| 2010/0007795 | A1* | 1/2010 | Ouyang | H03M 1/127 341/155 |
| 2010/0207806 | A1* | 8/2010 | Takahashi | G01S 13/18 342/109 |
| 2011/0249727 | A1* | 10/2011 | Bock | H04N 19/176 375/240.03 |
| 2013/0154875 | A1* | 6/2013 | Sierwald | G01S 13/958 342/192 |
| 2013/0175435 | A1* | 7/2013 | Drader | G01C 3/08 250/208.2 |
| 2016/0033644 | A1* | 2/2016 | Moore | G01S 7/4813 356/5.01 |
| 2016/0209498 | A1* | 7/2016 | Kanter | G01S 7/487 |
| 2017/0083742 | A1* | 3/2017 | Lamare | G06V 40/1394 |
| 2017/0108443 | A1* | 4/2017 | Kurihara | G06V 10/44 |
| 2017/0269257 | A1* | 9/2017 | Scoullar | G01V 5/0041 |
| 2017/0349944 | A1 | 12/2017 | Rothberg et al. | |
| 2018/0027224 | A1* | 1/2018 | Javidnia | G06V 10/44 382/154 |

FOREIGN PATENT DOCUMENTS

| | | | |
|---|---|---|---|
| DE | 102013114737 A1 | | 6/2015 |
| EP | 2088453 A1 | | 8/2009 |
| JP | 2012089980 | * | 10/2012 |
| WO | WO-2015045717 A1 | * | 4/2015 ........... G01C 13/002 |

OTHER PUBLICATIONS

Arlt, Jochen, et al., "A study of pile-up in integrated time-correlated single photon counting systems", Review of Scientific Instruments, vol. 84, No. 10, AIP Publishing LLC, Jan. 1, 2013, 11 pages.

Buller, George S., et al., "Ranging and Three-Dimensional Imaging Using Time-Correlated Single-Photon Counting and Point-by-Point Acquisition", IEEE Journal of Selected Topics in Quantum Electronics, vol. 13, No. 4, Jul./Aug. 2007, pp. 1006-1015.

Coates, P B, et al., "The correction for photon 'pile-up' in the measurement of radiative lifetimes", Journal of Scientific Instruments (Journal of Physics E), IOP Publishing, Bristol, GB, Series 2, vol. 1, Aug. 1, 1968, pp. 878-879.

Gnecchi, Salvatore, et al., "Digital silicon photomultipliers with OR/XOR pulse combining techniques", IEEE transactions on electron devices, IEEE service center, Piscataway, NJ, US—vol. 63, No. 6, Mar. 1, 2016, XP011600270, pp. 1105-1110.

Massa, J. S., et al., "Rangefinding using Time Correlated Single Photon Counting", XP10234156, May 12, 1997, pp. 36-43.

Widrow, "Study of Tough Amplitude Quantization by means of Nyquist Sampling Theor", IEEE, Dec. 1956, 11 pages.

* cited by examiner

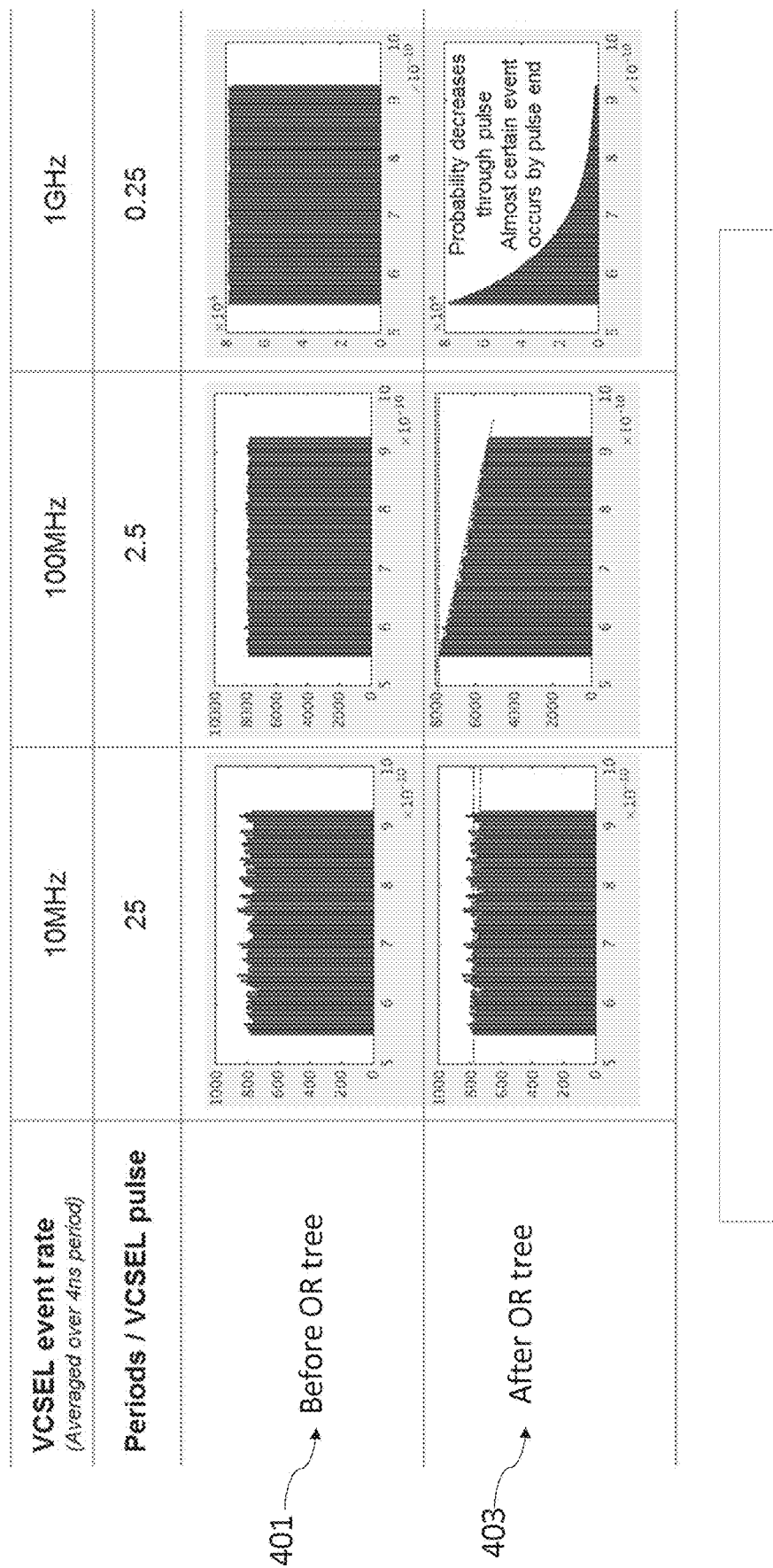

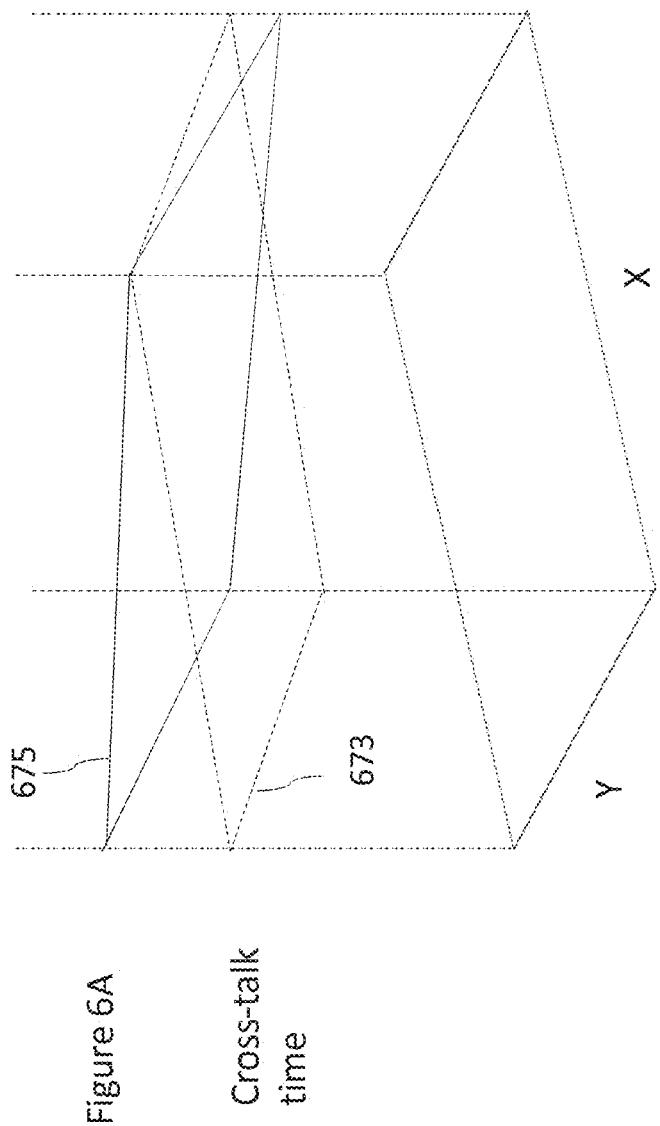

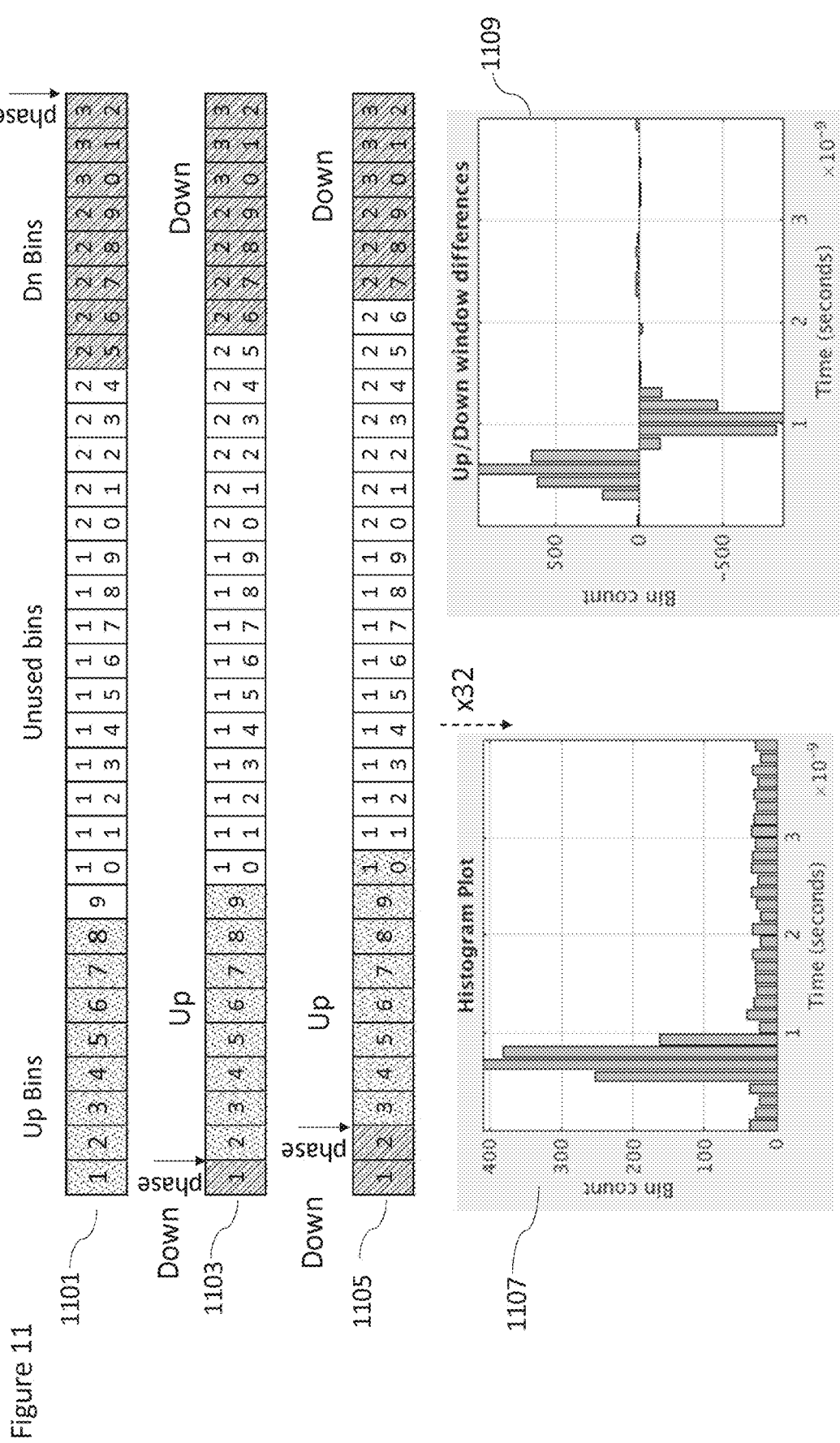

METHOD AND APPARATUS FOR PROCESSING A HISTOGRAM OUTPUT FROM A DETECTOR SENSOR

CROSS-REFERENCE TO RELATED APPLICATIONS

This application is a continuation application of U.S. application Ser. No. 15/886,353, filed on Feb. 1, 2018, which claims the benefit of European Patent Application No. 17158736.3, filed on Mar. 1, 2017, European Patent Application No. 17305222.6, filed on Mar. 1, 2017, European Patent Application No. 17305223.4, filed on Mar. 1, 2017, and European Patent Application No. 17305224.2, filed on Mar. 1, 2017, which applications are hereby incorporated herein by their reference.

TECHNICAL FIELD

Some embodiments relate to range extraction using processed histograms generated from a time of flight sensor-pile up correction.

BACKGROUND

Devices for determining the distance (or range) to objects are known. One currently used method is called "Time of Flight" (ToF). This method comprises sending a light signal towards the object and measuring the time taken by the signal to travel to the object and back. The calculation of the time taken by the signal for this travel may be obtained by measuring the phase shift between the signal coming out of the light source and the signal reflected from the object and detected by a light sensor. Knowing this phase shift and the speed of light enables the determination of the distance to the object.

Single photon avalanche diodes (SPAD) may be used as a detector of reflected light. In general, an array of SPADs is provided as a sensor in order to detect a reflected light pulse. A photon may generate a carrier in the SPAD through the photo electric effect. The photo generated carrier may trigger an avalanche current in one or more of the SPADs in an SPAD array. The avalanche current may signal an event, namely that a photon of light has been detected.

SUMMARY

Some embodiments relate to range extraction and other parameters such as noise and maximum distance determination extracted from histogram data generated using a time-of-flight photosensitive sensor and in particular but not exclusively to an apparatus with a sensor comprising an array of photosensitive devices.

According to an aspect, a method for processing a histogram output from a detector sensor comprises calculating a median point of a pulse waveform within the histogram. The pulse waveform has an even probability distribution over at least one quantization step of the histogram around the median point.

The method may further comprise: receiving the histogram output as filtered histogram data comprising a plurality of histogram bin values, the filtered histogram data comprising the pulse waveform with a defined width and histogram bin position; and determining from the filtered histogram data and based on the median point at least one parameter associated with the pulse, wherein the at least one parameter comprises at least one of: an object range; a range noise estimate; and a maximum distance detection value.

Determining from the filtered histogram data an object range associated with the pulse may comprise at least one of: applying a linear interpolation to a phase weighted filtered histogram to determine a phase value associated with the median point associated with a zero crossing event; applying a interpolation to a phase weighted filtered histogram, the phase weighted filter comprising a first part and a second part and generating a first difference value based on the sum of the second part and a negative first part, such that for at least one histogram position where the first difference value crosses zero then the interpolation comprises the determined histogram position value+(|difference value for the bin position|/|difference value for the bin position|+|difference value for the bin position following the zero crossing bin position|); and applying a interpolation to phase weighted filtered histogram to determine a phase value associated with the median point, the phase weighted filter comprising a first part, a second part and a third part and generating a first difference value based on the sum of the first part, the second part and a negative third part, and generating a second difference value based on the sum of the second part, the third part and a negative first part, such that for at least one histogram position where the first difference value and the second difference value are greater than zero then the interpolation comprises the determined histogram position value+0.5+((the third part value−the first part value)/(2*(the second part value−a determined ambient value))).

Determining from the filtered histogram data a range noise estimate associated with the pulse may comprise: determining shot noise contributions from each filter part; applying a range interpolation based transfer function to each shot noise contribution; and combining the range interpolation based transfer function components to generate the range noise estimate.

Determining from the filtered histogram data a range noise estimate associated with the pulse may comprise: generating a noise value based on a phase weighted filtered histogram, the phase weighted filter comprising a first part A, a second part B located at the detected median event bin and a third part C, and wherein the noise values is $$\text{Noise}_{combined} = \sqrt{\left(\frac{C+A}{4\times(B-amb)^2}\right)+\left(\frac{(C-A)^2\times(B+amb)}{4\times(B-amb)^4}\right)}$$

$$= \sqrt{\text{Noise}_{Numerator}^2 + \text{Noise}_{Denominator}^2}$$

where $\text{Noise}_{numerator} = \dfrac{\sqrt{C+A}}{2(B-amb)}$ and $$\text{Noise}_{denominator} = \left|\frac{C-A}{2(B-amb-\sqrt{(B+amb)})} - \frac{C-A}{2(B-amb)}\right|,$$

and amb is a determined ambient level.

Determining from the filtered histogram data a range noise estimate associated with the pulse may comprise: generating a noise value based on a phase weighted filtered histogram, the phase weighted filter comprising a first part A, a second part B located at the detected median event bin and a third part C, and wherein the noise values is $$\text{Noise}_{phase} = \sqrt{\left(\frac{C + C_x + A + A_x}{4 \times (B - B_x - amb)^2}\right) + \left(\frac{(C - C_x - (A - A_x))^2 \times (B + B_x + amb)}{4 \times (B - B_x - amb)^4}\right)},$$

and $A_x$, $B_x$ and $C_x$ are internal parasitic path components associated with the phase weighted filter first part, second part and third part respectively and amb is a determined ambient level.

Determining from the filtered histogram data and based on the median point a maximum distance detection value may comprise determining based on a threshold from an ambient level and a return level from a determined calibration value the distance at which a returned signal is not significant to determine a range determination.

Determining from the filtered histogram data and based on the median point a maximum distance value (Dmax) may comprise:

$$D\max = \frac{\text{Part } A}{\text{Part } B} \text{ where}$$

$$\text{Part } A = Dcal \times 2 \times \text{Signal} @ Dcal \times \frac{Ref}{Ref @ Dcal} \text{ and where}$$

$$\text{Part } B = Sconf \times \sqrt{\text{Signal} @ Dcal \times \frac{Ref}{Ref @ Dcal}} \pm$$

$$\sqrt{\left(Sconf^2 \times \text{Signal} @ Dcal \times \frac{Ref}{Ref @ Dcal}\right) + \left(4 \times \text{Signal} @ Dcal \times \frac{Ref}{Ref @ Dcal} \times \left((Aconf \sqrt{Ambient})\right)\right)},$$

wherein a distance at which a Dmax calibration is taken defined by Dcal, a signal value in events/bin generated from a 100% target at the Dmax calibration distance defined as Signal@Dcal, a value of reflectance of target used for signal calibration defined as Ref@Dcal, a desired reflectance that Dmax is to be calculated for defined as Ref, the ambient count defined as Ambient, the signal confidence (in other words 94% valid ranges implies 2 sigma) defined as SConf, and an ambient noise floor aligned with the histogram processing assumption defined as Aconf.

According to a second aspect, an apparatus for processing a histogram output from a detector sensor comprises a median point determiner configured to calculate a median point of a pulse waveform within the histogram. The pulse waveform has an even probability distribution over a quantization step of the histogram around the median point.

The apparatus may further comprise an input configured to receive the histogram output as filtered histogram data comprising a plurality of histogram bin values, the filtered histogram data comprising the pulse waveform with a defined width and histogram bin position; and a parameter extractor configured to determine from the filtered histogram data and based on the median point at least one parameter associated with the pulse, wherein the at least one parameter comprises at least one of: an object range; a range noise estimate; and a maximum distance detection value.

The median point determiner may be configured to: apply a linear interpolation to a phase weighted filtered histogram to determine a phase value associated with the median point associated with a zero crossing event; applying a interpolation to a phase weighted filtered histogram, the phase weighted filter comprising a first part and a second part and generating a first difference value based on the sum of the second part and a negative first part, such that for at least one histogram position where the first difference value crosses zero then the interpolation comprises the determined histogram position value+(|difference value for the bin position|/|difference value for the bin position|+|difference value for the bin position following the zero crossing bin position|); and apply a interpolation to phase weighted filtered histogram to determine a phase value associated with the median point, the phase weighted filter comprising a first part, a second part and a third part and generating a first difference value based on the sum of the first part, the second part and a negative third part, and generating a second difference value based on the sum of the second part, the third part and a negative first part, such that for at least one histogram position where the first difference value and the second difference value are greater than zero then the interpolation comprises the determined histogram position value+0.5+((the third part value−the first part value)/(2*(the second part value−a determined ambient value))).

The parameter determiner may be configured to determine from the filtered histogram data a range noise estimate associated with the pulse by: determining shot noise contributions from each filter part; applying a range interpolation based transfer function to each shot noise contribution; and combining the range interpolation based transfer function components to generate the range noise estimate.

The parameter determiner configured to determine range noise estimate associated with the pulse may be configured to: generate a noise value based on a phase weighted filtered histogram, the phase weighted filter comprising a first part A, a second part B located at the detected median event bin and a third part C, and wherein the noise value is $$\text{Noise}_{combined} = \sqrt{\left(\frac{C + A}{4 \times (B - amb)^2}\right) + \left(\frac{(C - A)^2 \times (B + amb)}{4 \times (B - amb)^4}\right)}$$

$$= \sqrt{\text{Noise}_{Numerator}^2 + \text{Noise}_{Denominator}^2}$$

where $\text{Noise}_{numerator} = \frac{\sqrt{C + A}}{2(B - amb)}$ and $$\text{Noise}_{denominator} = \left| \frac{C - A}{2(B - amb - \sqrt{(B + amb)})} - \frac{C - A}{2(B - amb)} \right|,$$

and amb is a determined ambient level.

The parameter determiner configured to determine from the filtered histogram data a range noise estimate associated with the pulse may be configured to: generate a noise value based on a phase weighted filtered histogram, the phase weighted filter comprising a first part A, a second part B located at the detected median event bin and a third part C, and wherein the noise value is $$\text{Noise}_{phase} = \sqrt{\left(\frac{C+C_x+A+A_x}{4\times(B-B_x-amb)^2}\right)+\left(\frac{((C-C_x-(A-A_x))^2\times(B+B_x+amb)}{4\times(B-B_x-amb)^4}\right)}$$

and $A_x$, $B_x$ and $C_x$ are internal parasitic path components associated with the phase weighted filter first part, second part and third part respectively and amb is a determined ambient level.

The parameter determiner configured to determine from the filtered histogram data and based on the median point a maximum distance detection value may be configured to determine a distance at which a returned signal is not significant to determine a range determination based on a threshold from an ambient level and a return level from a determined calibration value.

The parameter determiner configured to determine a maximum distance value (Dmax) from the filtered histogram data and based on the median point may be configured to determine:

$$D\text{max} = \text{Part } A/\text{Part } B \text{ where}$$

$$\text{Part } A = Dcal \times 2 \times \text{Signal}@Dcal \times \frac{Ref}{Ref@Dcal} \text{ and}$$

$$\text{Part } B = Sconf \times \sqrt{\text{Signal}@Dcal \times \frac{Ref}{Ref@Dcal}} \pm$$

$$\sqrt{\left(Sconf^2 \times \text{Signal}@Dcal \times \frac{Ref}{Ref@Dcal}\right) + \left(4\times\text{Signal}@Dcal \times \frac{Ref}{Ref@Dcal} \times ((Aconf\sqrt{\text{Ambient}}))\right)},$$

wherein a distance at which a Dmax calibration is taken defined by Dcal, a signal value in events/bin generated from a 100% target at the Dmax calibration distance defined as Signal@Dcal, a value of reflectance of target used for signal calibration defined as Ref@Dcal, a desired reflectance that Dmax is to be calculated for defined as Ref, the ambient count defined as Ambient, the signal confidence (in other words 94% valid ranges implies 2 sigma) defined as SConf, and an ambient noise floor aligned with the histogram processing assumption defined as Aconf.

The detector sensor may be a single photon avalanche diode array sensor.

The detector sensor may be a time-of-flight sensor.

The detector sensor may be a detector array sensor.

BRIEF DESCRIPTION OF THE DRAWINGS

Some embodiments will now be described by way of example only and with reference to the accompanying Figures in which:

FIG. 4A shows example probability of OR-tree pile-up event shadowing;

FIG. 6A shows an example crosstalk distribution over a sensor surface;

FIG. 11 shows example histogram plots and bin differences produced using the method shown in FIG. 10.

DETAILED DESCRIPTION OF ILLUSTRATIVE EMBODIMENTS

The concept in embodiments herein is the implementation of processing of histogram data from a sensor device in order to be able detect or determine object pulses and furthermore to generate or extract parameters such as object distance or range, noise and maximum detection range having determined the object pulses. In some embodiments the processing of the histogram data may include the generation of adaptive width filters which may be applied to the sensor output histograms to filter out undesired cross-talk and assist in identifying median values which may be used to extract a suitable range or distance value in a time-of-flight sensor.

Figure 1A:
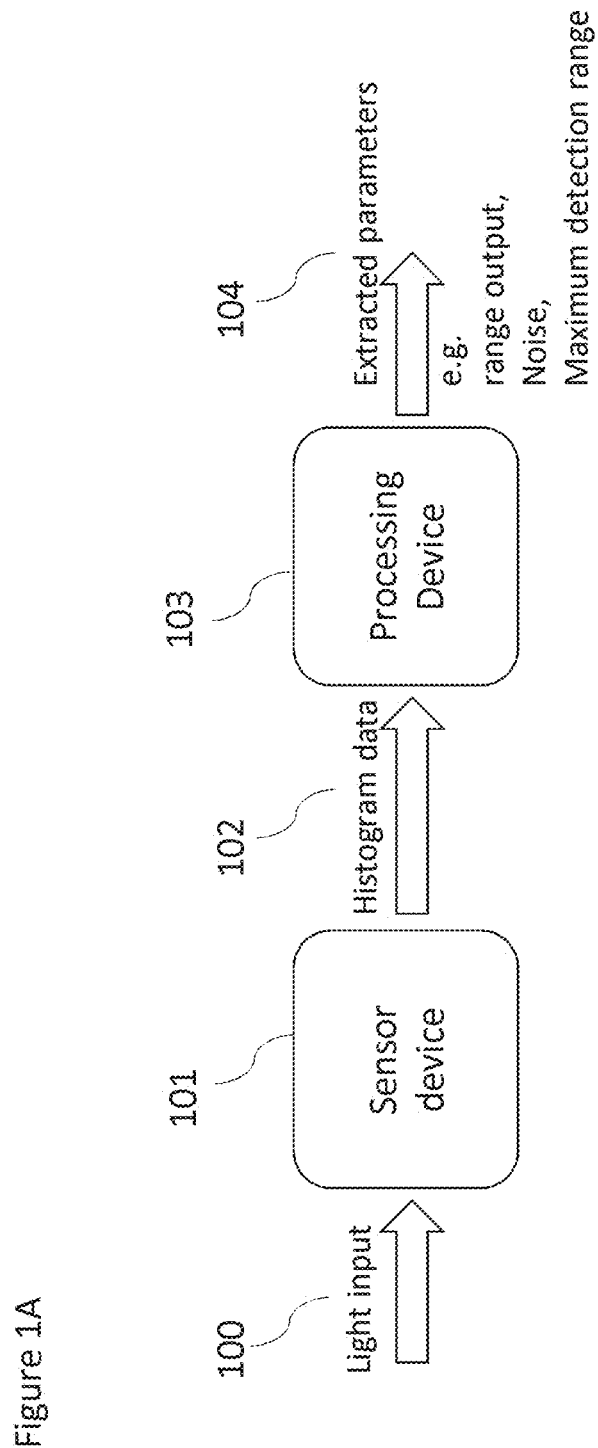
FIG. 1A shows schematically a system according to some embodiments comprising the sensor device and co-processor configured to determine a range from the sensor to an object.

In FIG. 1A a schematic view of an example system comprising a sensor device and processing device is shown. In the example shown in FIG. 1A the system comprises a sensor device 101 which is configured to receive a light input 100 and is configured to output 'raw' histogram data 102 which is passed to the processing device 103. Furthermore the system comprises a sensor device 101 which is configured to receive the 'raw' histogram data and processes the 'raw' histogram data 102 to extract or generate suitable parameters such as a distance or range output 104 representing the distance between the sensor device and an object within the 'field-of-view' of the sensor device.

The sensor device 101 may comprise a light source (such as a vertical cavity surface emitting laser VCSEL or light emitting diode LED), a suitable light source driver, an array of single photon avalanche diode (SPAD) elements and a time to distance converter (TDC) or histogram generator configured to output the 'raw' histogram data representing photon event detection counts for a number of time bins. The histogram data 102 may be passed to the processing device 103. However other configurations may be implemented such as the sensor device comprising a light source, light source driver+a fast photodiode detector with steered charge, an analogue to digital converter (ADC) etc.

The sensor device 101 may for example comprise a generator/driver configured to provide a periodic electric signal (the periodic signal may for example be a square shaped signal or a sine shaped signal or any suitable periodic signal). The generator/driver may furthermore power the light source thus generating a 'modulated' light output.

As discussed above an example of a light source may be a light emitting diode, or any known lighting device, for example, a laser diode. The signal coming out of the light source is transmitted towards an object and is reflected by the object.

The reflected light signal is detected by a light sensor which in the following examples is an array of SPADs. The SPAD array may integrate several photo detection elements in the form of Single-photon avalanche diodes, or "SPADs" also called Geiger mode avalanche photodiodes. These devices have a reverse biased p-n junction in which a photo-generated carrier can trigger an avalanche current due to an impact ionization mechanism. SPADs may be designed to operate with a reverse bias voltage well above the breakdown voltage.

At an initial time, the diode is biased to a voltage larger than its breakdown voltage. The reception of a photon in the diode junction area starts an avalanche in the diode, which creates an electric pulse. The diode is then biased back to a voltage smaller than the breakdown voltage, so that the SPAD reacts again to the reception of a photon. SPADs can currently be used in cycles having reactivation periods shorter than 10 ns. Thereby, SPADs can be used at high frequency to detect objects at relatively short distances from the measurement device, for example, distances ranging from a few millimeters to several meters. In different embodiments, different ranges may be supported.

Such detection elements as discussed above may also be rapid charge transfer photodiodes. The signal output by the sensor is thus phase-shifted from the signal provided by the generator/driver by an angle which correlates with the distance to the object.

A Time to Digital Converter (TDC) may be configured to receive the signals generated by generator/driver and by the sensor and calculate the phase shift (or time difference) between these signals to obtain a distance to object. The detector (SPAD array) is configured to generate many fast readings in a short time period and thus the time to distance converter may be configured to generate a histogram of detected events. For example, with a periodic pulsed system, the detected event arrival times may be quantized to build up histogram data which may be post processed to identify the position/distance of multiple targets within the Field of View.

Figure 3:
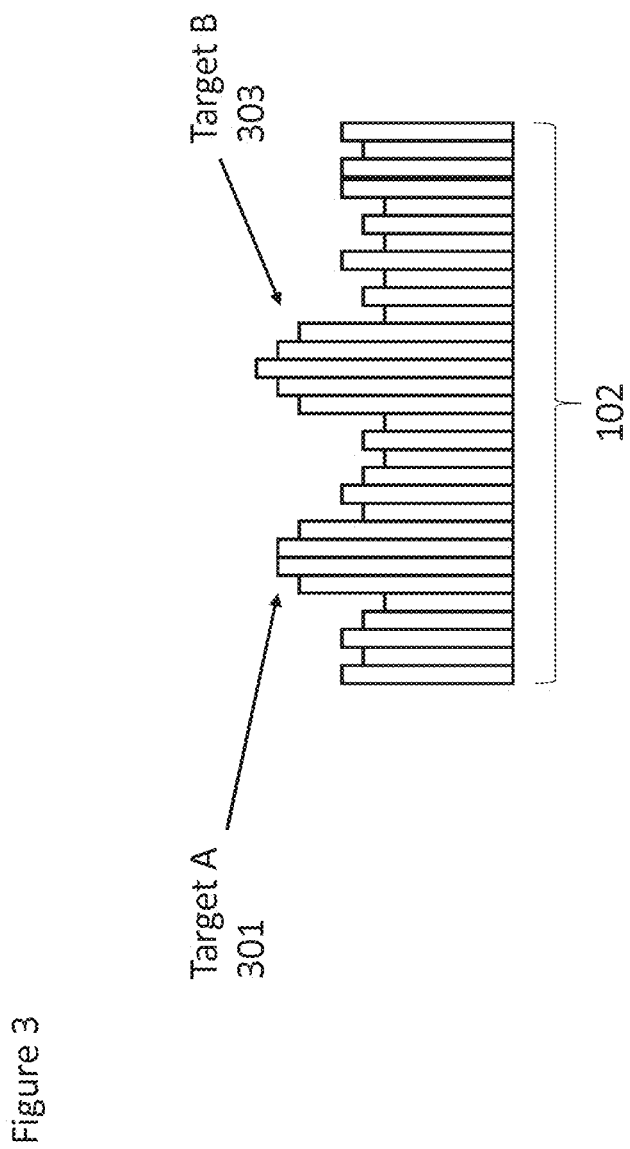
FIG. 3 shows an example of raw histogram data produced by a sensor device within the system shown in FIG. 1 in some embodiments.

An example generated histogram may be shown in FIG. 3. The example histogram data 102 is shown as a series of bars each bar representing a detected event frequency or event count for specific time bins or intervals. In the example shown in FIG. 3 two target 'reflections' can be seen. The first, target A 301 is shown as a peak above an ambient level which occurs earlier than a second, target B 303 peak.

In some embodiments, a further reference detector within the sensor device is used. The reference detector is configured to receive the light emitted by the light source, and is close to the light source. The distance to the object may be determined using the timing difference between the reference detector receiving the light from the light source and the sensor receiving the light from the reflected object.

The histogram data based distance determination analysis as shown hereafter is applicable to any time of flight ranging application such as gesture analysis where the range output may be used as an input to algorithms to detect motion of a hand or other object to control an interface, and auto-focus assist where the range output may be used as a guide for an auto-focus scheme to speed up camera focus time.

The concept as described herein is the addition or integration of the processing device 103 with the sensor device 101. In some embodiments the processing device 103 is physically integrated with the sensor device 101. In other words the processing device is implemented in the same device as the sensor device. For example within register transfer level (RTL) synthesis or on board microcontroller unit (MCU) on the sensor device. In some embodiments the processing device 103 is logically integrated with the sensor device 101 but is implemented on a separate, dedicated processing device. In some further embodiments the processing device 103 is implemented as software on a host device configured to receive the output from the sensor device 101.

Figure 1B:
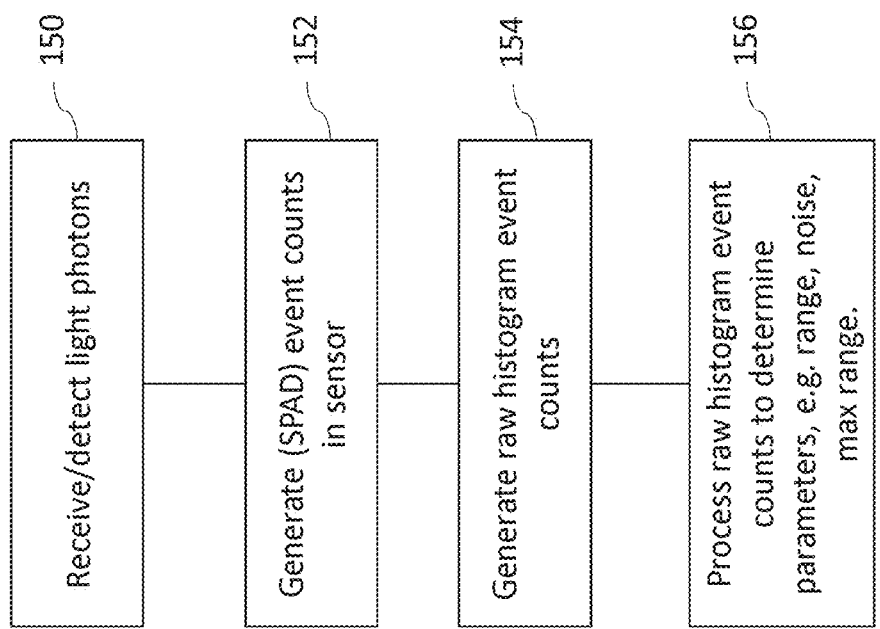
FIG. 1B shows a flow diagram of the operations of the system shown in FIG. 1A.

The integration of the processing device 103 and the sensor device 101 may for example be shown by the flow diagram shown in FIG. 1B wherein the operations of the system as shown in FIG. 1A are described.

Thus for example the method is shown wherein the light photons are received or detected. The operation of receiving/detecting the photons is shown in FIG. 1B by step 150.

Then the sensor device may be configured to generate (SPAD) detected event counts. The operation of generating the (SPAD) event counts is shown in FIG. 1B by step 152.

The raw histogram event counts may furthermore be then generated. The operation of generating the raw histogram event counts is shown in FIG. 1B by step 154.

The raw histogram event counts may then be processed in order to determine parameters such as range, noise, and max detection range. The operation of processing the raw histogram even counts to determine the parameters is shown in FIG. 1B by step 156.

Figure 2A:
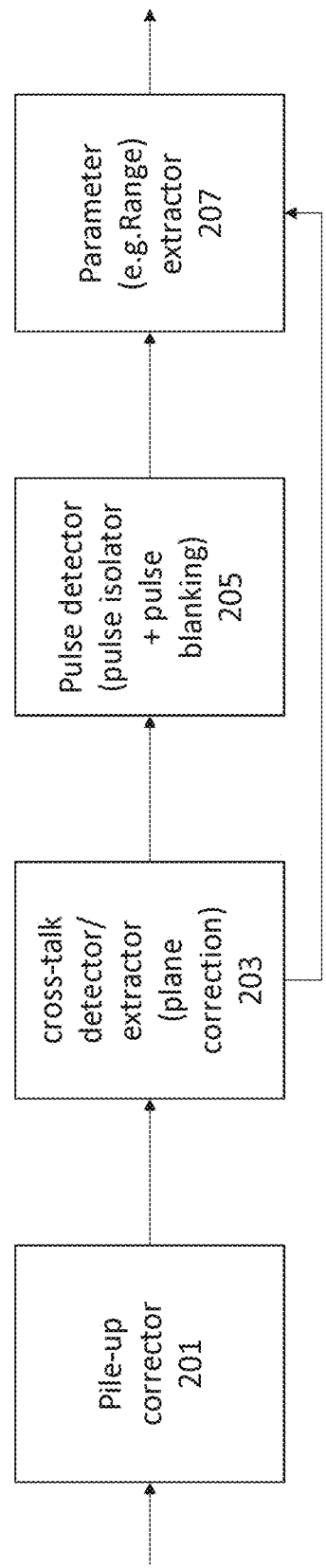
FIG. 2A shows schematically components which can be implemented within the processing device shown in FIG. 1A.

As described in further detail hereafter and as shown in FIG. 2A the processor device may comprise various processing modules which may process the histogram data. In some embodiments the processor device comprises some but not all of the processing modules described hereafter.

For example as shown in FIG. 2A the processor device 103 may comprise a pile-up corrector 201. The pile-up corrector 201 in some embodiments may be configured to receive the histogram data from the sensor device 101 and process the data to attempt to correct for pile-up errors in the histogram data. The operation of the pile-up corrector 201 is described in further detail later in the application. The corrected histogram data may in some embodiments be further passed to a cross-talk detector 203 (but in some embodiments may pass the corrected data to the pulse detector and/or parameter extractor.

In some embodiments the processor device 103 may comprise a cross-talk detector 203. The cross-talk detector 203 may be configured to receive the output of the pile-up corrector 201 (or in some embodiments where there is no pile-up corrector 201 receive the raw histogram data directly). The cross-talk detector 203 may thus determine whether the histogram data comprises cross-talk components and furthermore attempt to at least partially remove these components. The operation of the cross-talk detector is described in further detail later in the application. The cross-talk detector 203 may furthermore output the corrected histogram data to the pulse detector and/or parameter extractor.

In some embodiments the processor device comprises a pulse detector 205. The pulse detector 205 may be configured to receive the output of the cross-talk detector 203 (or the pile-up corrector 201) and be configured to detect and filter (or isolate or blank) pulses within the histogram data. The operation of the pulse detector is described in further detail later in the application. These determined pulses may be passed to the parameter extractor 207.

In some embodiments the processor device comprises a parameter extractor 207. The parameter extractor 207 may be configured to receive the output of the cross-talk detector 203 and/or the pulse detector 205 and be configured to extract suitable parameters, such as range from the detected pulses within the histogram data. The operation of the parameter extractor 207 is described in further detail later in the application. These parameters may be output.

Figure 2B:
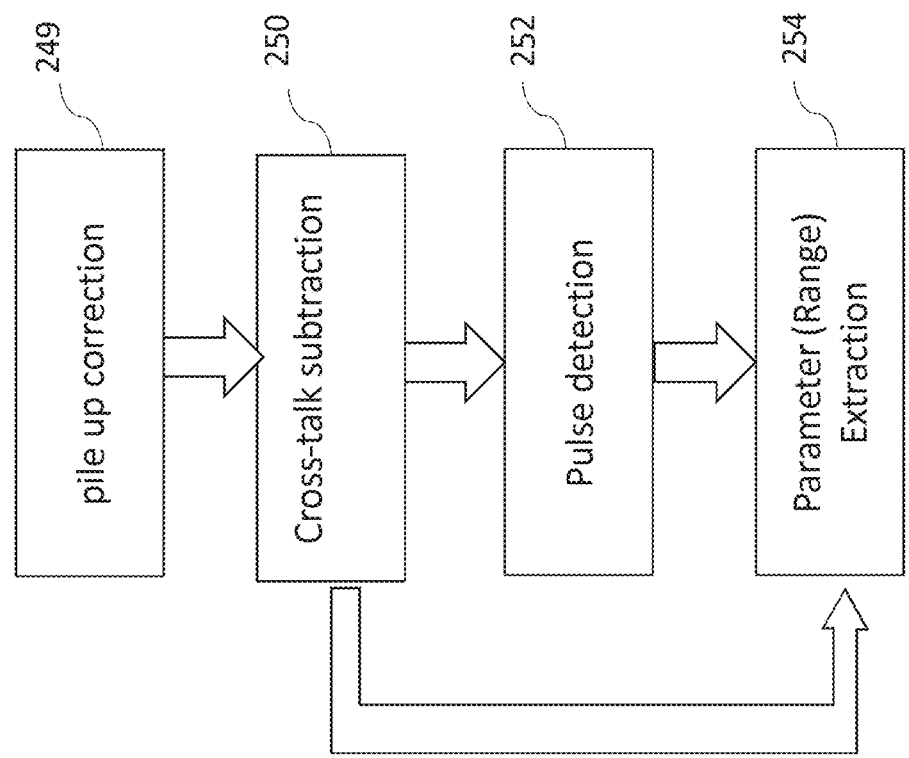
FIG. 2B shows a flow diagram of the operations of the processing device shown in FIG. 2A.

With respect to FIG. 2B the operation of the processor device as shown in FIG. 2A is described in further detail.

The method may comprise processing the received histogram data to attempt to correct for pile-up errors. The operation of the correcting for pile-up errors is shown in FIG. 2B by step 249.

The method may further comprise detecting and correcting for cross-talk (in other words determining whether the histogram data comprises cross-talk components and furthermore attempting to at least partially remove these components. The operation of the detecting and subtracting cross-talk is shown in FIG. 2B by step 250.

The method may further comprise detecting and filtering (or isolating or blanking) pulses within the histogram data. The operation of detecting and filtering (or isolating or blanking) pulses within the histogram data is shown in FIG. 2B by step 252.

Furthermore in some embodiments the method may comprise extracting suitable parameters, such as range from the detected pulses within the histogram data. The operation of extracting or determining suitable parameters, such as range from the detected pulses within the histogram data is shown in FIG. 2B in step 254.

We will now discuss the issues and problems with current systems and the aspects of the system shown above which address these problems.

As discussed above there are problems associated with current time-of-flight ranging schemes. Pile-up, for example, may be problematic. Pile-up is a term which refers to the issue found within SPAD based systems and can occur either at the SPAD or within the sensor within the OR tree level. At the SPAD level pile up occurs when a photon event occurs before a previous SPAD event is fully quenched and recharged. In the OR tree case, pile up occurs when the OR tree output is already high when another detected photon event arrives, resulting in the new event not being counted at the output.

This effect for example can be shown with respect to FIG. 4a. FIG. 4a shows an example pile-up for various simulated event rates. There are shown three columns representing simulated VCSEL event rates of 10 MHz, 100 MHz and 1 GHz. A first row 401 represents the probability of detecting an event counts for a time period before the OR tree, in other words before the effect of pile-up occur. The second row 403 represents the probability of detecting the event counts for a time period after the OR tree, in other words after the effect of pile-up occur. As can be seen the earlier events are detected with a higher probability as the earlier event 'shadows' the later event.

The effect of pile-up on the return from a target is that as there is higher probability of detecting earlier events the system will under range and produce a distance measurement which is systematically biased to produce a shorter distance value as a result.

Current approaches to address pile-up have been to implement a dynamic SPAD selection scheme. In other words dynamically turning off SPADs where high light conditions are detecting in an attempt to reduce the pile up effect. Similarly other attempts have been to place apertures over some SPADs within the system. Where high light levels are detected and therefore pile-up is likely to be present then a switch is made to use the aperture SPADs to reduce count rate.

Both of these approaches have the effect of reducing the total number of events received. This can be a problem if ambient light is high since the number of 'signal' photons received when reducing the total number of events will be low. Furthermore these approaches result in spatial subsampling of the array. In order to achieve this some SPADs, and therefore areas of the sensor must be disabled to achieve the regulation.

Furthermore these approaches are typically applied in an iterative manner and thus may requires a number of iterations before the correct number of SPADs are enabled. This switching iteration may not be able to produce good quality output for challenging or fast changing scenes, for example where the ambient level changes quickly and dramatically.

Figure 4B:
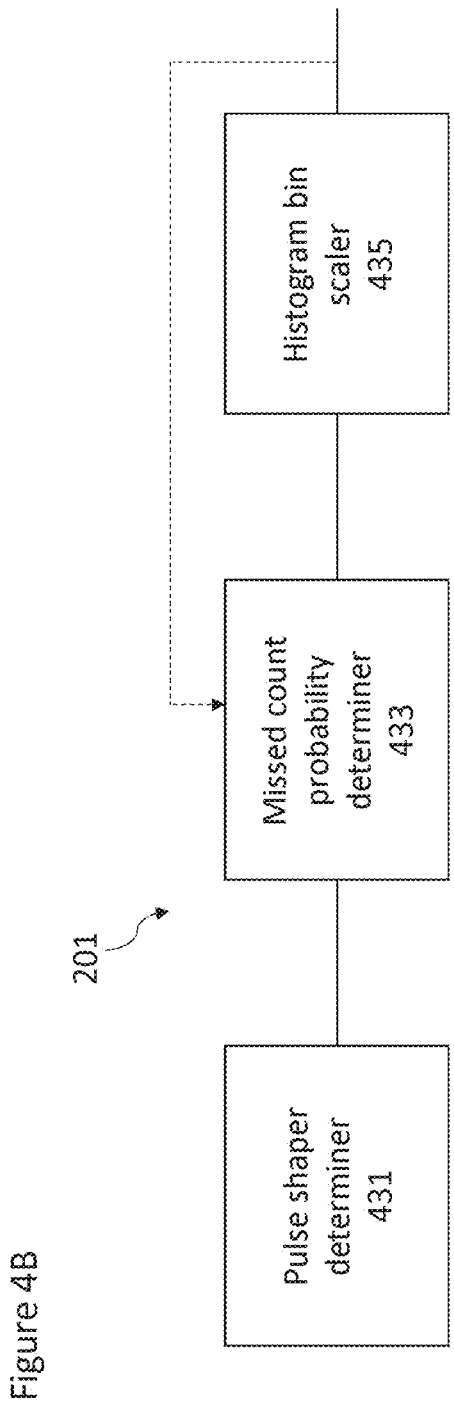
FIG. 4B shows schematically an example pile-up corrector as shown in FIG. 2A according to some embodiments.

The concept applied in the pile-up corrector shown herein is shown schematically in FIG. 4B.

The pile-up corrector in some embodiments comprises a pulse shaper determiner 431 configured to determine a filter length $t_{PULSE\_SHAPER}$ which may be applied to the histogram data to shape the histogram data output count event. The pulse shaper determiner 431 in some embodiments may be configured to determine the length of the filter $t_{PULSE\_SHAPER}$ by applying a pulse inversion method. A pulse inversion method can be summarized as:

Performing a first Ranging on the SPAD array output;
Performing a second ranging, this time inverting the SPAD array output;
Subtracting the range measurements to find the difference.

The pulse shaper determiner 431 in some embodiments may be configured to determine the length of the filter $t_{PULSE\_SHAPER}$ by applying a digital method. A digital method can be summarized as:

Search the histograms for 0→1 transition;
(determine falling edge via search for 1→0 transition);
Average the difference over multiple pulse in a low count scenario (for example using the reference array, a calibration mode, or a low DSS limit on return) to determine the learning of the filter pulse width.

In some embodiments the pile-up corrector 201 comprises a missed count probability determiner 433. The missed count probability determiner 433 in some embodiments may receive the output of the pulse shaper determiner 431 and the histogram bin data. Having determined the pulse shaper width an estimate of the counts in the bin and preceding bins before the pile-up effect may be determined by the missed count probability determiner 433.

The missed count probability determiner 433 may in some embodiments determine the probability of missed counts by applying weightings based on the pulse shaper width to the determined number of events which could cause pile-up. The weightings may be allocated on a bin by bin basis, accounting for pulse shaper width only partially overlapping a bin. Furthermore in some embodiments the first quantization period and last quantization period effect the bin in question approximately half the time.

Figure 4C:
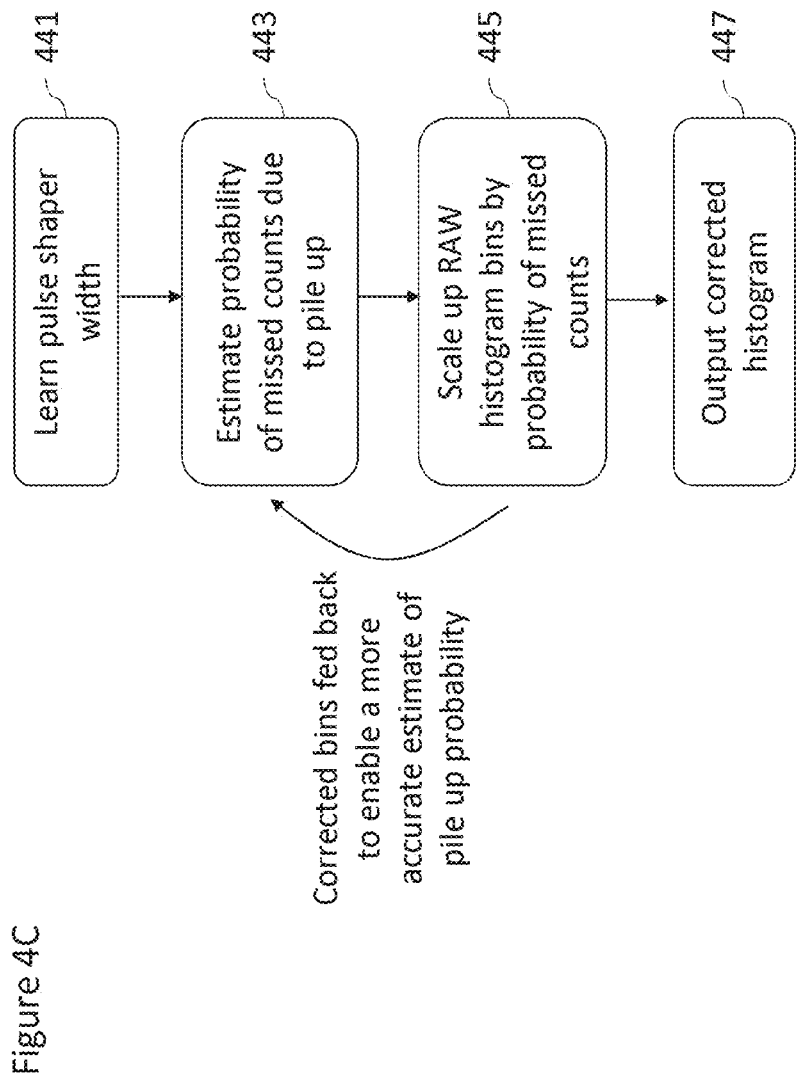
FIG. 4C shows a flow diagram of the operation of an example pile-up corrector as shown in FIG. 4B according to some embodiments.
Figure 4D:
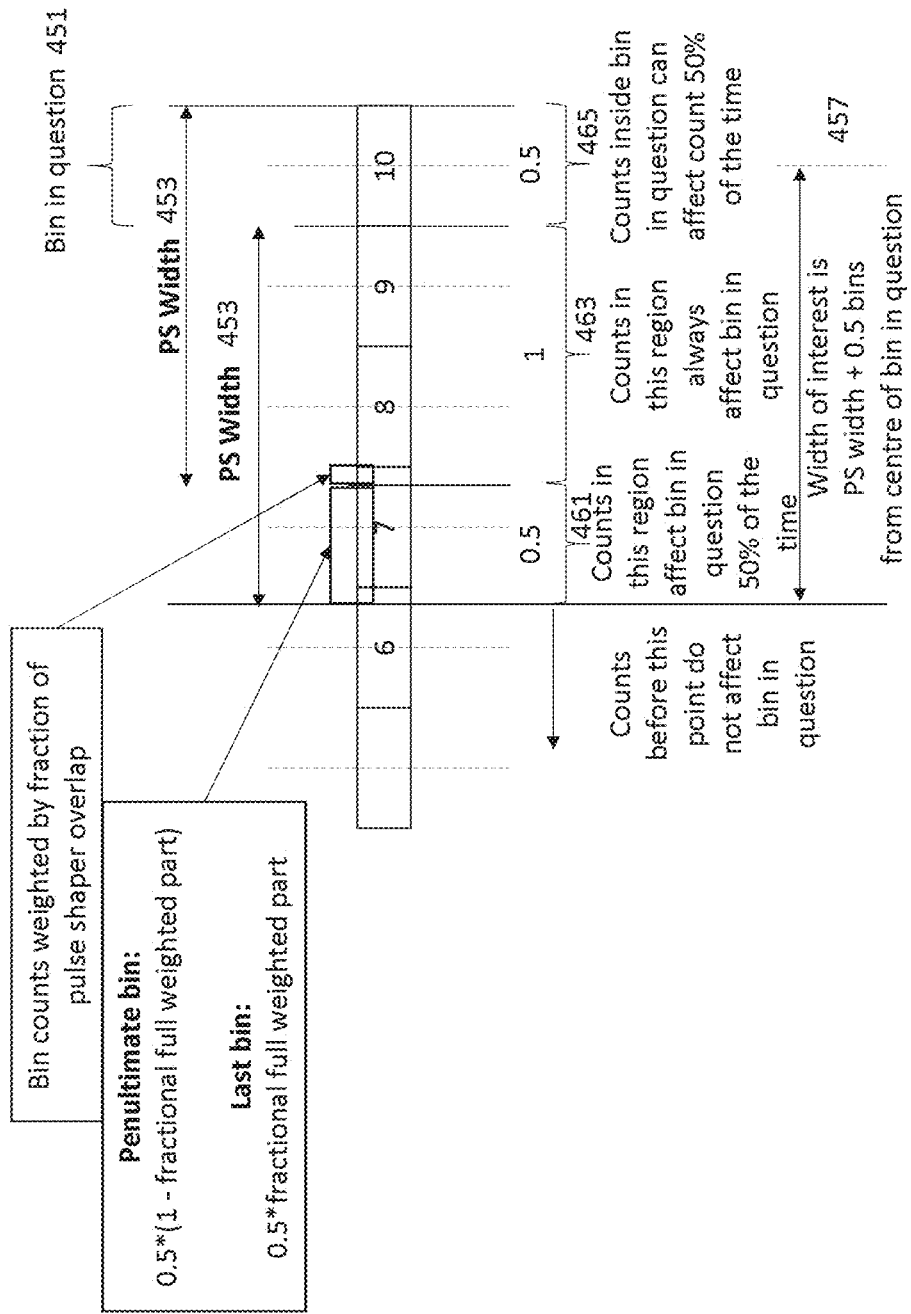
FIG. 4D shows an example of pulse shaper weighting function as applied in the histogram bin scaler as shown in FIG. 4B according to some embodiments.

FIG. 4D for example shows the weightings applied in an example probability determination. The example shows a series of histogram bins, numbered as bins 6, 7, 8, 9, and 10 of which the bin 10 is the one being analyzed (or is the bin in question 451). The bin 10 has applied to it a first pulse shaper width PS Width 453 from the start of the bin and a second PS width from the end of the bin. Counts before the first pulse shaper width do not affect the bin in question as any events detected before this do not shadow the bin.

The width of interest 457 is thus defined as the PS width plus 0.5 bins from the center of the bin in question. Furthermore there are defined three regions. A first region 465 which is within the actual bin. Any counts inside the bin in question can affect count probability for 50% of received events. A second region 463 defined by the overlap period of the first and second PS width where counts in this region always affect the probability of the bin in question. A third region 461 defined by the period covered by the first PS width only is where counts in this region affect the probability of the bin in question for 50% of the received events.

As the pulse shaper width may not be a whole number of bin widths the counts for the second and third regions may require a weighting function to be applied to the values. Thus for any fraction of a bin within the second region the bin counts may be multiplied by the determined fractional value. Similarly for the third region the bin counts may be multiplied by the determined fractional values and furthermore by the weighting effect of the third region (which as the counts in the area affect the bin in question only 50% of the time is 0.5).

Having determined the probability determination this information may be passed to a histogram bin scaler 435.

In some embodiments the pile-up corrector 201 comprises histogram bin scaler 435. The histogram bin scaler 435 may be configured to receive the output of the missed count probability determiner 433 and the histogram bin data. The histogram scaler then may add the determined count events from the missed count determiner 433 to the bin values. The histogram bin scaler furthermore in some embodiments is configured to correct the ambient estimate in a similar manner.

These processed values may then be output. In some embodiments the processed bin values may be feedback to the missed count probability determiner 433 to create a more accurate estimate of pile-up probability.

With respect to FIG. 4C an example flow diagram of the pile-up correction operation is shown.

First the pulse shaper width is determined or learnt. The operation of learning the pulse shaper width is shown in FIG. 4C by step 441.

Then the estimate of the probability of missed counts due to pile up using the pulse shaper width is determined. The estimating of the probability of missed counts due to pile-up is shown in FIG. 4C by step 443.

Then the scaling up of the raw histogram bin by the probability of missed counts is performed. The scaling up of the raw histogram bin by the probability of missed counts is shown in FIG. 4C by step 445.

In some embodiments this scaled up histogram data (or corrected bin data) may be passed back to enable more accurate estimates of the pile-up probability to be performed. This is shown in FIG. 4C by the feedback arrow between step 445 and 443.

Then the corrected histogram data may be output. The outputting of the corrected histogram data is shown in FIG. 4C by step 447.

Figure 4E:
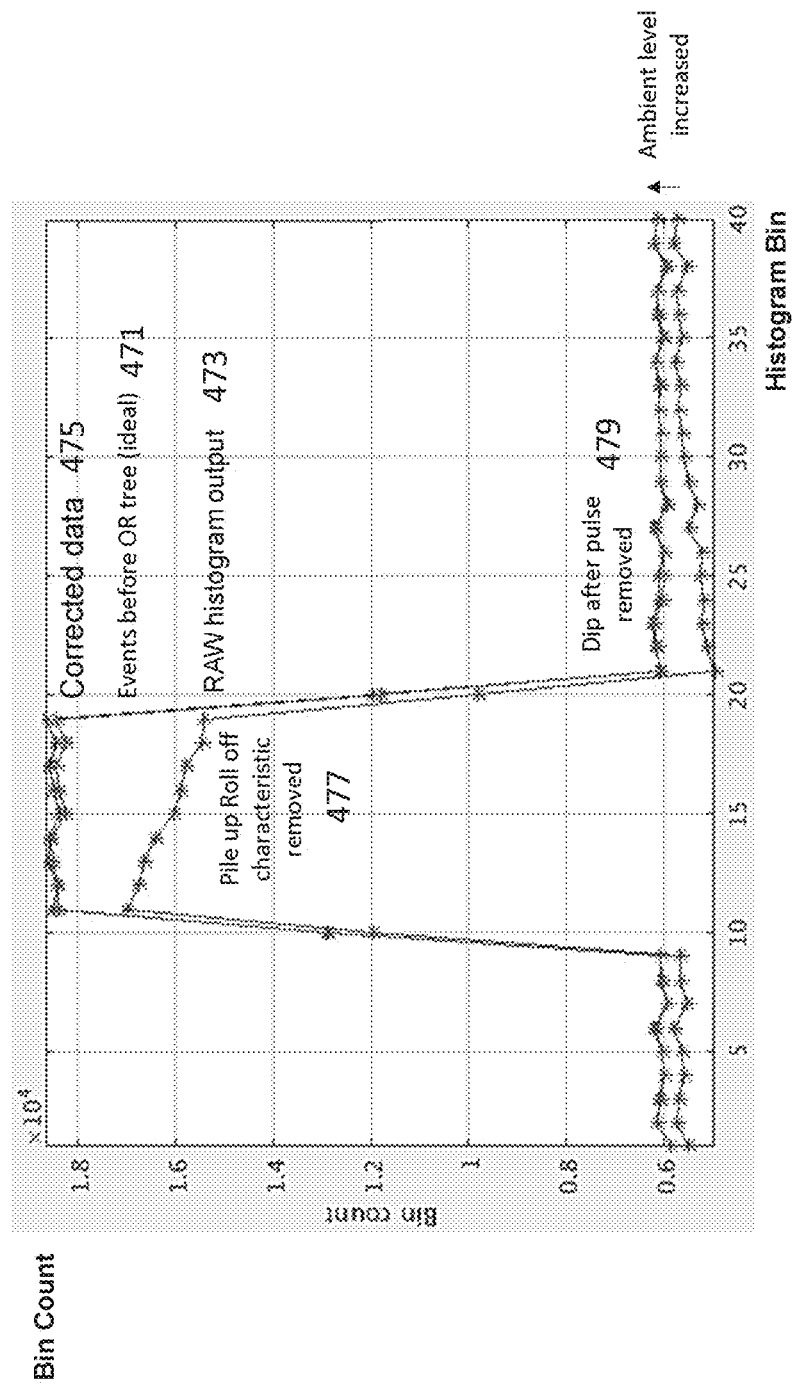
FIG. 4E shows a graph of the performance of a simulated correction applied by the pile-up corrector as shown in FIG. 4B according to some embodiments.

With respect to FIG. 4E an example simulation of the effect of pile-up and the correction of pile-up using the pile-up corrector as described above is shown. The graph shows a series of bin count against bin plots where a pulse is generated and detected above an ambient level.

In the example shown the ideal (event count before OR tree) plot 471 is shown. Furthermore is shown the RAW histogram output plot 473 is shown. The plot shows the typical pile-up roll off characteristic during the pulse and furthermore a characteristic dip in the ambient count after the pulse. The corrected histogram plot 475 shows the pile-up roll off characteristic during the detected pulse removed 477. Furthermore the dip after the pulse in the ambient is removed 479 and the ambient level increased.

Although the examples shown above are with respect to a single pulse the pile-up corrector will produce similar corrections in multi-pulse and for modulated light (for example sine wave based) systems.

In some embodiments the pile-up corrector may be able to address the SPAD pile up effects. In these embodiments the pulse shaper may be disabled and a similar compensation operation performed on the histogram bins. In these embodiments the total event counts divided by number of SPADs enabled may be used to estimate a probability of SPAD pile up. Then the total counts are then scaled in the same way as before. Since a SPAD dead time (which can be in order of ions) can exceed the VCSEL period (which can be in order of 4 ns), it is possible that some bins will be blocked from detection multiple times.

It has been demonstrated in simulations that the pile-up correction performs well for a range of event rates. However in some embodiments the pile-up corrector is further configured to determine when very high light levels and event rates are detected. As at very high event rates there are very high degrees of pile up it is possible that two light levels (a lower and higher light level) can result in the same output count rate. As this may cause errors in the correction from the histogram data the pile-up corrector may be configured to operate below a defined (very high) light level.

Figure 5A:
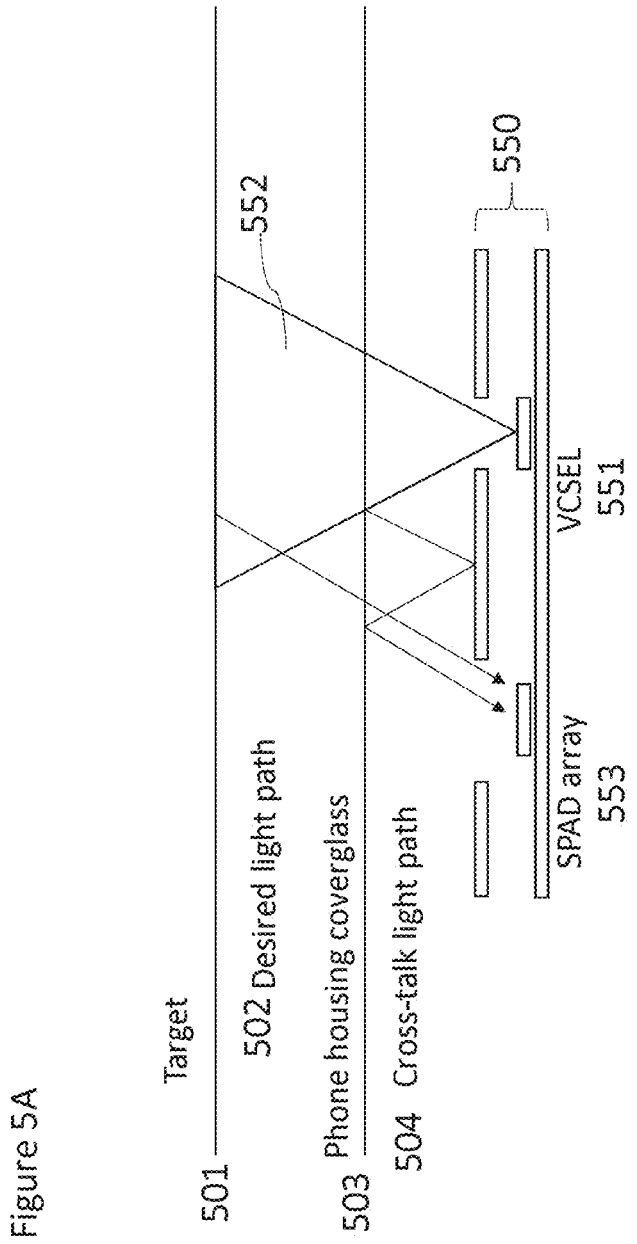
FIG. 5A show a sensor arrangement wherein crosstalk would be visible within the histogram generated by the sensor device.

Other problems associated with current time-of-flight ranging schemes include cross-talk. Cross-talk is a term used to describe the effect of a parasitic light path on the histogram data generated by the sensor. FIG. 5a for example shows a situation where cross-talk may interfere with the determination of range to a target object. In this example the sensor device 550 comprises a light source in the form of a VCSEL 551 which generates light 552. The light 552 may be reflected from the phone housing cover glass 503 along a cross-talk light path 504 to the SPAD array 553. The light 552 may also be reflected from the target 501 along a desired light path 502 to the SPAD array 553.

Figure 5B:
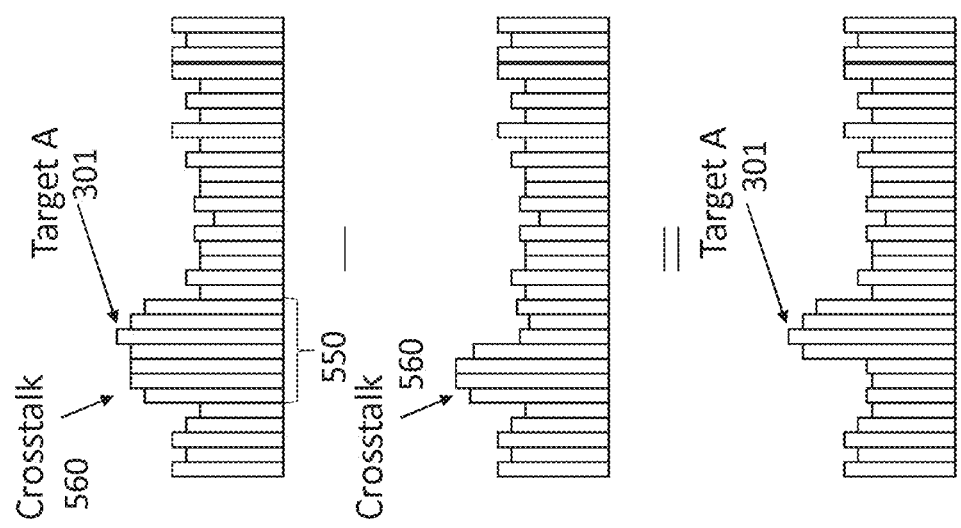
FIG. 5B shows an example histogram produced by the sensor arrangement shown in FIG. 5A showing visible crosstalk at a single point on the sensor.

The cross-talk light path 504 adds a contribution which can be problematic if the target is close to the sensor. The effect on a histogram reflecting the example shown in FIG. 5a is shown in FIG. 5b where the histogram shows a 'single' pulse 550 with contributions from the crosstalk 560 and target A 301 reflections. In other words the pulses produced from the crosstalk 560 and target A 301 reflections merge requiring the operation of de-correlating the crosstalk from the secondary pulse 560 from the target reflection pulse 301. Furthermore the merging of pulses produces a false target detection at the mid-point of the crosstalk 560 and Target 301 pulse combination or some clipping will occur due to the increased overall pulse width.

Furthermore although cross-talk is shown in FIGS. 5a and 5b as being a single point issue the cross-talk effect may differ across the whole of the sensor surface. For example as shown in FIG. 6A the cross-talk component may not be the same across the x and y dimensions of the sensor as shown by the dashed plane 673. However as shown by the plane 675 in FIG. 6A the function may be a linear or non-linear function.

Figure 5C:
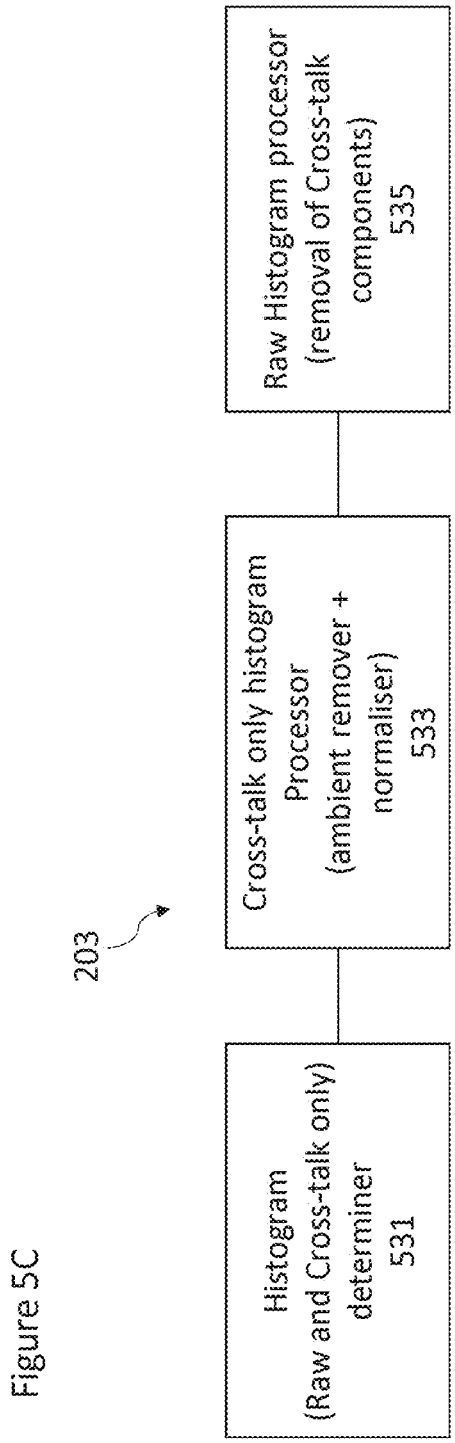
FIG. 5C shows schematically an example cross-talk detector as shown in FIG. 2A according to some embodiments.

The concept of the cross-talk correction algorithm component is to capture, even when no target of significant intensity is present, at least one histogram which provides the location, shape and intensity of the cross-talk waveform (or other noise source waveform). A schematic view of an example cross-talk detector/extractor 203 according to some embodiments is shown in FIG. 5C.

The cross-talk detector/extractor 203 may in some embodiments comprise a histogram determiner 531. The histogram determiner may be configured to receive or determine from the sensor a raw histogram. The raw histogram in some embodiments may be the output from the pile-up corrector and thus may already be partially processed to address the pile-up.

A single point of the sensor histogram 550 is shown by the top part of FIG. 5B which comprises contributions from both the crosstalk 360 and the target 301.

Having determined or generated the raw histogram the cross-talk detector/extractor and the histogram determiner 531 may be configured to generate a further histogram comprising only the cross-talk components. This is shown in FIG. 5B by the center histogram comprising only the components which form the cross-talk 360.

The cross-talk only histogram could be captured in some embodiments during a device test with a cover glass present.

In some embodiments the cross-talk only histogram may be determined by employing a target 'detector' configured to determine whether there are no other major target objects obstructing the crosstalk histogram portion and then extracting the cross-talk component from the histogram. The target 'detector' algorithm may be based on temporal changes in pulse positions, pulse widths, differencing applications, intensity information, additional sensors outside of time-of-flight sensor, etc.

In some embodiments the cross-talk only histogram is determined by detecting within the histogram data a portion of the histogram data which remains fixed in time and thus inferring the cross-talk only component of the histogram.

The cross-talk detector/extractor 203 may in some embodiments comprise a cross-talk only histogram processor 533. The cross-talk only histogram processor 533 may be configured to receive the cross-talk only histogram data and process this data.

For example in some embodiments having detected or determined the cross-talk only histogram the processor 533 may be configured to remove any ambient contribution (this may for example comprise a determined fixed value or DC level subtraction and an optional windowing out of the ambient noise) since the approximate crosstalk location can be known/determined.

The processor may furthermore in some embodiments be configured to process the cross-talk only histogram (with ambient levels removed) to normalize the histogram. For example in some embodiments the histogram count values are divided by the number of enabled SPADs to give a per SPAD histogram.

In some embodiments a reference range is also stored close to the point in time of the cross talk histogram acquisition.

In some embodiments the processor is configured to average the crosstalk only histogram from multiple range operations to reduce the effect of photon shot noise.

The cross-talk detector/extractor 203 may in some embodiments comprise a raw histogram processor 535. The raw histogram processor 535 may be configured to receive the raw histogram and the processed cross-talk only histogram from the histogram processor 531 and cross-talk only histogram processor 533 respectively and be configured to subtract or remove the processed crosstalk only contribution histogram from the raw histogram.

This may be achieved by multiplying the normalized cross-talk only histogram by the number of SPADs used to generate the raw histogram in order to produce a weighted cross-talk histogram.

In some embodiments an additional reference measurement is made and the weighted cross-talk histogram can be shifted by any difference in the current reference range from the reference range made at the point of crosstalk capture.

For example, if the reference range shifts by ¼ bin width to the right, meaning that the captured crosstalk histogram should also be shifted ¼ width to the right, then the processor shifts ¼ of each bin's content into the bin to the right. For an integer shift, simply shift the full weighted crosstalk histogram to the right by an integer number of bins.

Then in some embodiments the weighted cross-talk only histogram is subtracted from the raw histogram to give a corrected histogram. The subtraction can be shown in FIG. 5B by the lower part which shows the target only 301 contribution.

In some embodiments the raw histogram processor 535 is configured to over correct for the cross-talk both in intensity and by making the subtracted component wider (in other words perform the cross-talk subtraction over more histogram bins). The over-correction may be performed in order to allow for the cross-talk pulse intensity/shape/position to shift over variations in process, voltage, temperature (PVT) and thus prevent the correction subtraction from being fully effective in removing all of the cross-talk pulse and thus enabling the detection and parameter determination algorithms detecting a false target. This scheme can also help to account for changes in the level of crosstalk received due to changes in the optical transmission/reflectance of materials, for example rain or smudges on coverglass.

Figure 5D:
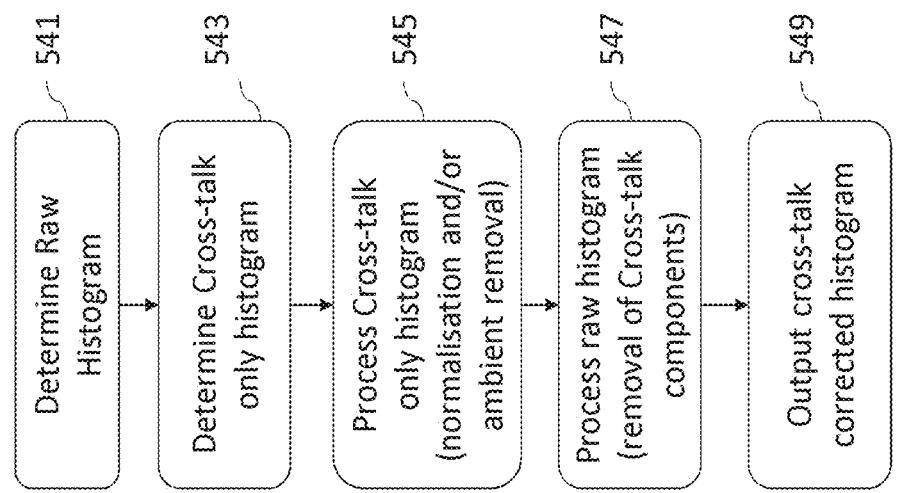
FIG. 5D shows a flow diagram of the operation of an example cross-talk detector as shown in FIG. 5C according to some embodiments.

In other words the operation of the cross-talk detection may be summarized by firstly determining a raw histogram such as described in FIG. 5D by step 541.

Then the cross-talk detection operation may determine a cross-talk only histogram. The determination of the cross-talk only histogram is shown in FIG. 5D by step 543.

The cross-talk only histogram may then be processed. For example to remove ambient contributions and to normalize the histogram for a determined SPAD reference number. The processing of the cross-talk only histogram is shown in FIG. 5D by step 545.

The raw histogram may then be processed to remove the cross-talk components by using the processed cross-talk only histogram data. The operation of processing the raw histogram data is shown in FIG. 5D by step 547.

The cross-talk corrected histogram may then be output. The outputting of the cross-talk corrected histogram is shown in FIG. 5D by step 549.

As indicated above in some embodiments the cross-talk correction is implemented as a function across the sensor. In other words as the cross-talk is a function in (x,y) SPAD position on the sensor and the histogram bin (bin) and may be defined as:

$$xtalk = f(bin, x, y)$$

As such in some embodiments the cross-talk correction is performed by plane fitting to the determined cross-talk for at least some positional samples. Thus in some embodiments rather than a single cross talk histogram determination a minimum of three quadrants or (spatial) regions of interests are processed as above to determine cross-talk histograms and then a spatial cross-talk model is generated such that the cross-talk may be defined as:

$$xtalk = x \times \left(\frac{\partial xtalk}{\partial x}\right) + y \times \left(\frac{\partial xtalk}{\partial y}\right) + xtalk\_offset \text{ where}$$

$$\frac{\partial xtalk}{\partial x} = xtalk \text{ gradient in } x,$$

$$\frac{\partial xtalk}{\partial y} = xtalk \text{ gradient in } y, \text{ and}$$

xtalk_offset = xtalk dc offset.

Figure 6D:
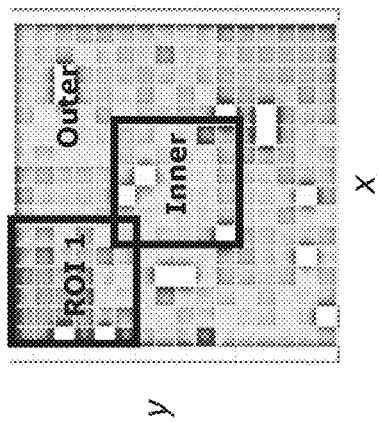
FIGS. 6B to 6D show various spatial modelling for region of interests modelling of the cross-talk.

In some embodiments rather than defining a model for cross-talk over the whole of the sensor, regions of interest are modelled separately. Thus for example, such as shown in FIG. 6B, in some embodiments an inner or central region and an outer surrounding region may be modelled separately as $$xtalk_{MM_{inner}}(bin) = \sum_{inner \cap DSS} f(bin, x, y)$$

$$xtalk_{MM_{outer}}(bin) = \sum_{outer \cap DSS} f(bin, x, y)$$

Figure 6C:
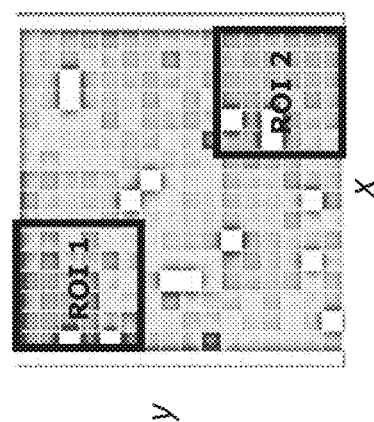
Figure 6B:
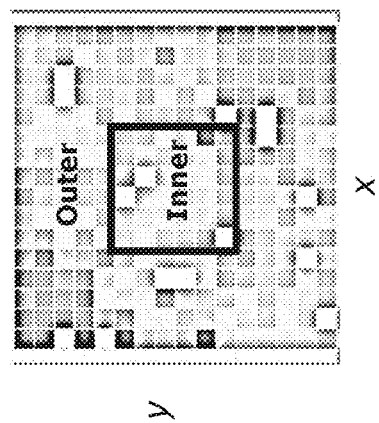

In some embodiments for example, such as shown in FIG. 6C, in some embodiments a first region of interest ROI 1 and second region of interest ROI 2 are modelled separately as $$xtalk_1(bin) = \sum_{ROI1 \cap DSS} f(bin, x, y)$$

$$xtalk_2(bin) = \sum_{ROI2 \cap DSS} f(bin, x, y)$$

In some embodiments for example, such as shown in FIG. 6D, in some embodiments a first outer region of interest ROI 1 and second inner region of interest, Inner, are modelled separately as $$xtalk_{inner_{ROI1}}(bin) = \sum_{inner \cap ROI1 \cap DSS} f(bin, x, y)$$

$$xtalk_{outer_{ROI1}}(bin) = \sum_{outer \cap ROI1 \cap DSS} f(bin, x, y)$$

Existing methods for processing the histogram attempt to detect the histogram peak in order to then extract parameters such as the time associated with the peak and thus from the time determine the distance between the sensor and the object. However current histogram pulse detection and parameter extraction or determination methods have associated problems.

For example an example histogram with an earlier or first target peak and a later or second target peak may be analyzed by finding the maximum bin value(s) within a histogram to determine pulse locations. This approach however limits the range resolution to the resolution of a histogram bin width. Thus for high accuracy results the sampling rate must be high. Having a high sampling rate impacts on the silicon area used and power consumption for the device. Furthermore for precise timing the scheme requires a very narrow pulse width high powered optical output. This can be difficult to achieve if mm-resolution is required.

An improvement to the peak detection method which has been implemented is a two-bin with additional window to capture ambient count values. An example of the two-bin scheme may be where two bin values from the histogram, which may be defined as Bin A and Bin B are selected. Furthermore from these bin values an ambient contribution is subtracted. The ratio between the Bin A and Bin B values can then define the range based on the light signal pulse width. For example the range parameter may be defined as Range_output=(Bin B–Bin A)*pulse_width/ (2*total_counts)

However this scheme is not satisfactory since it assumes that the light pulse is perfectly square and furthermore requires precise knowledge of the optical pulse shape and thus does not take into account other elements of the system which may distort the pulse shape, including jitter and sampling inaccuracies.

A further scheme which has been implemented to extract parameters from a determined peak within a histogram data set is determining a center of mass within a determined peak series of histogram bins. In such methods the ambient contribution is subtracted from the bin values and then a center of mass calculation is performed around a pulse of interest. This method is problematic since it requires a reasonably high OSR (Over Sampling Ratio) to ensure range linearity. It is furthermore problematic as it requires a uniform pulse shape well matched to a multiple of bin widths. If this is not met then range error (or a Differential Non-Linearity error) will result since the mean based calculation makes an assumption that all events within a bin are weighted around the center of that bin. Also events occurring at the extreme points of any window of interest will have more impact on the mean than values occurring close to the mean of the distribution. This has the impact that noise from ambient results in a higher overall ranging noise.

As discussed previously after generating the corrected (for example with respect to pile-up and/or cross-talk) histogram data a range calculation can be performed on the data by a two stage process of identifying a suitable pulse or bins and then from these identified pulses determining parameters such as range from them.

In the following embodiments this range extraction scheme may be based on assessment of counts received on histogram bins around a determined median bin location.

To ensure no non-linearity issues, the scheme relies on the sampled signal having a shape with an even distribution for one quantization step either side of the pulse median.

The scheme described herein is one where the histogram data is fundamentally not continuous but is built from a probability distribution function from multiple (typically 1000's) of events built up over an integration period.

The parameter extraction methodology in the following embodiments can thus be considered to comprise four steps, the first associated with median event detection and the second to the fourth associated with parameter extraction.

Firstly pulse detection. In this step the goal is to determine the position of the two sample points around the median event, as well as the pulse width to enable filter widths to be tuned for the extraction phase. Around detected pulses the histogram output is padded with ambient level only.

Secondly parameter range calculation. In this step the goal is to compare count ratios to ascertain the precise position of the median event within the constraints of shot noise.

Thirdly parameter noise estimation. In this step the goal is to directly use the histogram data to estimate the noise associated with the ranging measurement.

Fourthly is parameter maximum distance (DMAX) estimation. In this step the goal is to calculate the maximum distance which it would be possible to detect, assuming a specific reflectance value, and assuming the target occupies the full field of view.

Two implementation methods for pulse weighted histogram extraction are described hereafter. It would be understood that in some embodiments although the methods described as 'method A' and 'method B' show a specific set or steps or operations to obtain the parameters that in some embodiments further hybrid methods may be formed by selecting parts of each of 'method A' and 'method B' and combining these parts.

Figure 7A:
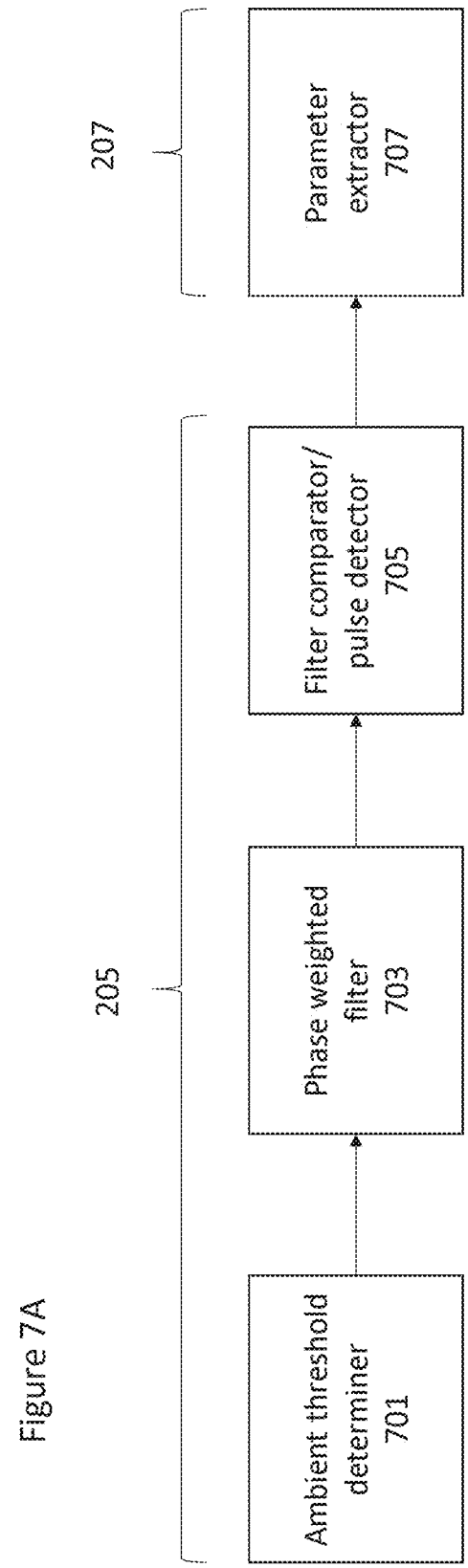
FIG. 7A shows schematically a first example pulse detector and range extractor according to some embodiments.

With respect to FIG. 7A an example pulse detector 205 and parameter extractor 207 suitable for implementing the 'method A' operations is shown.

In some embodiments the pulse detector comprises an ambient threshold determiner 701. The ambient threshold determiner may be configured to receive the output of the cross-talk detector 203 (or the pile-up corrector 201) and be configured to determine an estimate of the ambient light and furthermore identify histogram areas of interest relative to the ambient light values.

In some embodiments the output of the ambient threshold determiner 701 can be passed to the phase weighted filter 703 as well as the processed histogram data.

In some embodiments the pulse detector furthermore comprises a phase weighted filter 703. The phase weighted filter 703 is configured to analyze the histogram data and the determined areas of interest to generate filter outputs which are further analyzed within the filter comparator/pulse detector 705. Although this example shows an ambient threshold determiner 701 followed by a phase weighted filter 703 it is understood that the order of the operations may be reversed or both are performed in parallel and the results of each are passed to the filter comparator 705.

The output of the phase weighted filter 703 may be passed to the filter comparator/pulse detector 705 where the result of the phase weighted filter is compared against criteria to identify whether the area of interest of the histogram is part of a detected signal pulse. These results and the histogram data may be passed to a parameter extractor 707 where the range/max range/noise parameters may be determined for each detected pulse.

In some embodiments the phase weighted filter 703 is an edge detecting filter configured to detect points of rising and falling edges.

Thus for example the phase weighted filter may be a +/− filter e.g. {1+1,+1,+1+1,−1,−1,−1,−1}—The number of +1 and −1 is controlled by the filter width of interest size the filter width of interest size may be determined relative to the VCSEL pulse width. For example in some embodiments $$+/-PW\text{ width}=1+2\times\text{CEILING}(\text{light-source pulse width}/2)\text{ phase clocks.}$$

In such a system the filter comparator/pulse detector 705 may be configured to compare the result of the phase weighted filter to identify a significant rising or falling edge. For example a significant negative output indicates a rising edge and significant positive output indicates a falling edge. In such embodiments having determined a rising and falling edge the filter comparator/pulse detector 705 may be configured to filter the histogram data to output a 'pulse' comprising the histogram values between the rising and falling edge bins and padding the histogram bins outside of the rising and falling edge with zero values.

Each 'pulse' histogram may then be analyzed according to any of the following parameter extraction methods to determine suitable parameter values.

In some embodiments the ambient threshold determiner 701 furthermore is implemented by determining a minimum magnitude change in the filtered data and indicating that a detected rising and falling edge is a valid pulse when the minimum magnitude change is passed.

In some embodiments a parameter extractor may be configured to receive the pulse histogram values and furthermore the phase weighted filter values and from the phase weighted filter values detect a positive zero crossing in the filtered output. At each valid positive zero crossing the parameter extractor may use linear interpolation to generate the phase value which may then be used to determine the median of the pulse and thus from this determine the range value.

In some embodiments the ambient threshold determiner 701 comprises a detection window filter configured to sum the bins within a detection window length. The detection window length in some embodiments is defined by the size of the signal pulse and furthermore related (and may be less than or equal) to the phase width filter width. The detection window filter may be applied for all of the possible window positions within the bins. For example if there are 256 bins then there are 256 detection windows.

For each detection window filter a sum of the detection events is calculated.

Then for each window position an ambient thresholding operation is performed where the possible detected location is indicated where the sum is greater than a threshold value greater than the ambient detection value. For example in some embodiments the detection indicator or flag is generated when sum>[det_win_size*amb_per_bin+thresh_sigma*sqrt (det_win_size*amb_per_bin)], where amb_per_bin is the ambient detection value per phase clock, and a good threshold value thresh_sigma is >=5 to account for noise from ambient events in the detection and ambient windows. The level of this threshold determines the likelihood of a false target being detected due only to ambient noise. A high threshold setting can prevent detection of an actual returned pulse with too low an intensity.

In some embodiments the phase weighted filter 703 is an 'ABC' window. The phase weighted histogram window width may be determined based on the light source pulse width with respect to the quantization/bin size. This width may be established from the input control to the light source, or from a pulse width established during the detection phase. Thus for example in some embodiments the window size in bin widths, where one bin width is the difference between two neighboring sampling phases, can be determined as ABC PW width=1+2×CEILING(light-source pulse width/2) phase clocks.

So where the light source pulse width is 4.xx phase clocks wide then the ABC PW window width is 7 phase clocks wide and furthermore the detection window width may be 5 phase clocks wide. Furthermore in such an example the ABC filter PW window may comprises a first A part two bins wide, a second B part which is one bin wide, and a third C part which is two bins wide.

In some embodiments the phase weighted filter 703 is furthermore configured to determine differences for every filter position to determine the phases (bin edges) preceding and following the pulse median. The differences may be calculated from the A, B and C parts and a determined ambient event level value according to the following:

Difference $X = DX = (A + B) - (C + amb)$

Difference $Y = DY = (B + C) - (A + amb)$

In some embodiments these values A, B, C, X, Y and amb may be passed to the filter comparator/pulse detector 705.

Figure 7B:
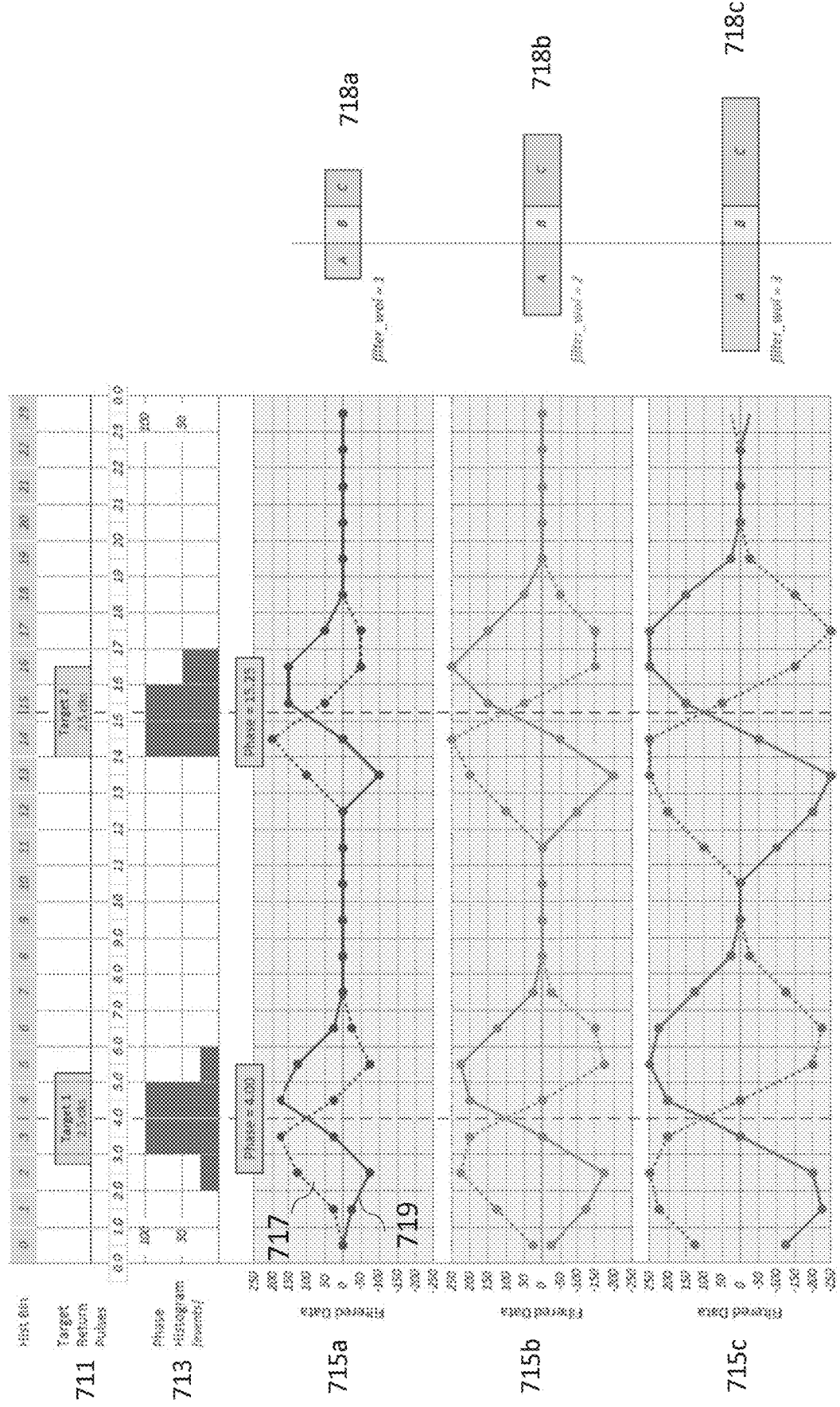
FIG. 7B shows a simulated two object example of the operation of the first example pulse detector and range extractor.

With respect to FIG. 7B is shown a series of simulated examples of the application of ABC filters 718. A first example filter 718*a* has a window of interest=1 and produces a phase output 715*a* showing DX 719 and DY 717 plots. A second example filter 718*b* has a window of interest=2 and produces a phase output 715*b* showing DX and DY plots. A third example filter 718*c* has a window of interest=3 and produces a phase output 715*c* showing DX and DY plots.

The filter comparator/pulse detector 705 may in some embodiments use the A, B, C, DX, DY and amb values and from these determine a median bin.

For example in some embodiments where DX and DY are both greater than zero then a median pulse bin has potentially been detected and this is indicated.

In some embodiments if DX=0 and DY=0 then no pulse has been detected. Furthermore in some embodiments to avoid missing pulses centered in the B phase then if DX<0 and DY>0 and for the next phase DX>0 and DY<0 then a pulse is detected. Similarly in some embodiments a pulse is detected when a value of DY is OR-ed with the NOT(DX) value of the following phase.

In some embodiments where the previous phase bin position has been flagged as a potential pulse then the current phase bin position is 'blocked' to avoid incorrect double pulse outputs around the same position.

Figure 7C:
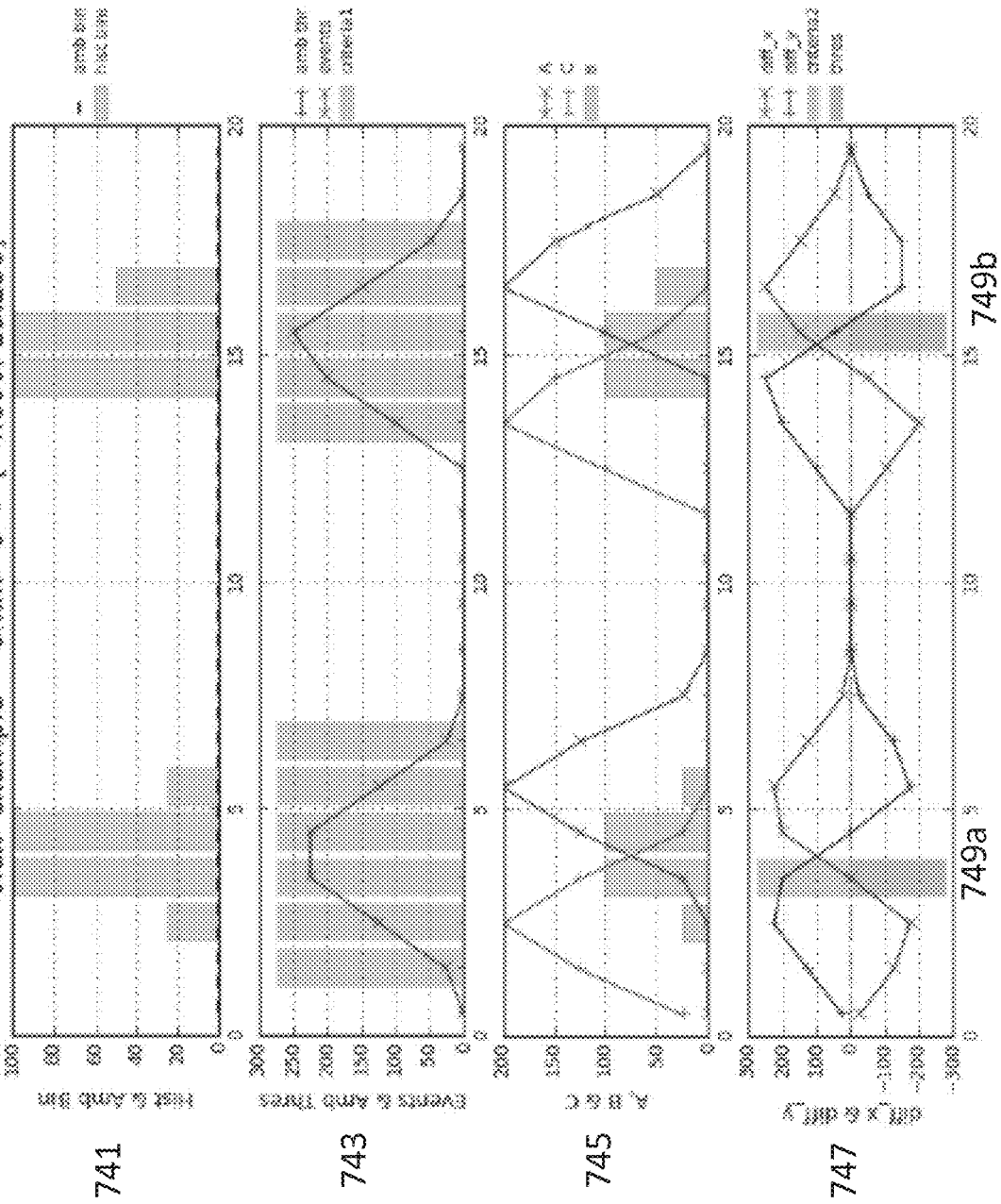
FIG. 7C shows a further simulated two object example of the operation of the first example pulse detector and range extractor.

FIG. 7C shows a similar example to that shown in FIG. 7B. FIG. 7C thus shows a plot 741 of example histogram bins (having been scaled for ambient bin events), plot 743 shows the output of the (ambient) detection stage where the ambient criteria are met for some of the histogram bins, plot 745 shows the A, B, C values associated with the histogram data, and plot 747 the DX, DY values and the PW transition criteria detection which result in the median bin detection outputs 749*a* and 749*b*.

Figure 7D:
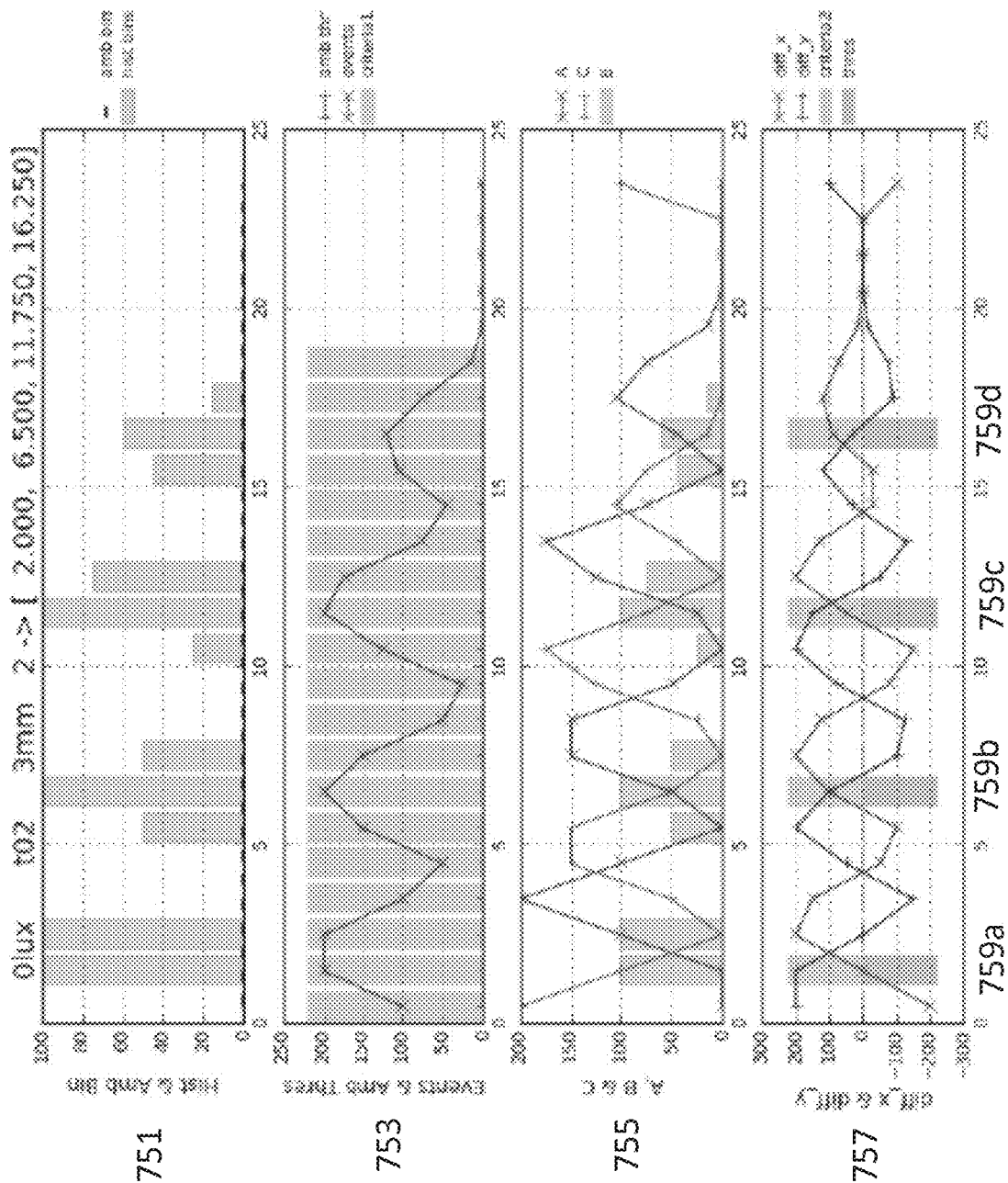
FIG. 7D shows a simulated four object example of the operation of the first example pulse detector and range extractor.

FIG. 7D shows a further example where plot 751 shows example histogram bins (having been scaled for ambient bin events), plot 753 shows the output of the (ambient) detection stage, plot 755 the A, B, C values, and plot 757 the DX, DY values and bins where the PW transition criteria are met which result in the median bin detection outputs 759*a*, 759*b*, 759*c* and 759*d*.

The filter comparator/pulse detector 705 having determined the positions of return event pulses where both the ambient thresholding and PW transition criteria give positive outputs and one or more bin phase positions are determined then these values may be passed to the parameter extractor 707 to determine parameters based on these values.

For example in some embodiments the parameter extractor 707 is configured to determine a range calculation based on the determined median bin values. Thus in some embodiments the parameter extractor 707 may be configured to calculate or determine the median phase from the A, B, C, and ambient values of the PW window for the determined median phase position using the following $$\text{Median Phase} = \frac{1}{2} + \frac{C - A}{2(B - amb)}$$

Having determined the median phase and knowing the bin location thus enables a range estimate to be generated associated with that determined pulse.

The filter comparator/pulse detector 705 may in some embodiments having determined the median position perform a calculation to estimate the noise associated with the measurement. In some embodiments the numerator shot noise effect on the range determination may be estimated as:

$$\text{Noise}_{numerator} = \frac{\sqrt{C + A}}{2(B - amb)}$$

and the denominator shot noise effect on the range may be determined as $$\text{Noise}_{denominator} = \left| \frac{C-A}{2(B - amb - \sqrt{(B+amb)})} - \frac{C-A}{2(B-amb)} \right|$$

The denominator noise contribution goes to zero when pulse is balanced between A and C and is modulated with pulse position. The range noise shape is non-Gaussian due to denominator noise effect, especially for received low counts. The standard deviation estimation may in some embodiments be taken from subtraction of sqrt(B) so any error over-estimates noise.

The total or combined shot noise may thus be estimated as $$\text{Noise}_{combined} = \sqrt{\text{Noise}_{Numerator}^2 + \text{Noise}_{Denominator}^2}$$

In some embodiments the noise for the determined range may be determined as $$\sigma_{phase} = \sqrt{\left(\frac{C+A}{4 \times (B-amb)^2}\right) + \left(\frac{(C-A)^2 \times (B+amb)}{4 \times (B-amb)^4}\right)}$$

In the embodiments where cross-talk subtraction or filtering occurs it is necessary to account for this subtraction in both the range and noise estimation calculations. For the range calculation, the crosstalk contribution estimation associated with parts A, B, C is subtracted. Contributions are denoted in the formula below by the 'x' subscript. As discussed previously these crosstalk contributions could be taken from fixed calibration at test, or from a scheme where these values are calculated or adjusted on the fly.

$$\text{phase} = \frac{(C - C_x) - (A - A_x)}{2(B - B_x - amb)}$$

from the crosstalk compensation algorithm stage. Although the crosstalk subtraction algorithm removes the DC level of the crosstalk, it is important to recognize that the photon shot noise from the crosstalk contribution will remain, and therefore must be accounted for if we are to accurately predict the noise of the ranging measurement.

To account for this, the cross-talk based noise calculation can be adjusted as shown below.

$$\sigma_{phase} = \sqrt{\left(\frac{C + C_x + A + A_x}{4 \times (B - B_x - amb)^2}\right) + \left(\frac{(C - C_x - (A - A_x))^2 \times (B + B_x + amb)}{4 \times (B - B_x - amb)^4}\right)}$$

The filter comparator/pulse detector 705 may in some embodiments from the data described above determine a maximum distance (Dmax) which could have been resolved had a target been present. This is useful since the system is effectively blind to targets beyond this maximum distance due to ambient noise in the system.

Thus for example using values such as a distance at which a Dmax calibration is taken defined by Dcal, a signal value in events/bin generated from a 100% target at the Dmax calibration distance (thus for example if a 17% target was used for calibration then this may be scaled by a ratio of reflectance—thus 100/17) defined as Signal@Dcal, a value of reflectance of target used for signal calibration defined as Ref@Dcal, a desired reflectance that Dmax is to be calculated for defined as Ref, the ambient count defined as Ambient, the signal confidence (in other words 94% valid ranges implies 2 sigma) defined as SConf, and an ambient noise floor aligned with the histogram processing assumption (i.e. a value of 6 implies that the signal in a bin must be >ambient+6 standard deviations to be considered valid) defined as Aconf, then a maximum distance defined as Dmax may be calculated by:

$$D\max = \text{Part } A / \text{Part } B \text{ where}$$

$$\text{Part } A = Dcal \times 2 \times \text{Signal@}Dcal \times \frac{Ref}{Ref@Dcal} \text{ and}$$

$$\text{Part } B = Sconf \times \sqrt{\text{Signal@}Dcal \times \frac{Ref}{Ref@Dcal}} \pm$$

$$\sqrt{\left(Sconf^2 \times \text{Signal@}Dcal \times \frac{Ref}{Ref@Dcal}\right) + \left(4 \times \text{Signal@}Dcal \times \frac{Ref}{Ref@Dcal} \times \left((Aconf \times \sqrt{\text{Ambient}})\right)\right)}$$

Figure 8A:
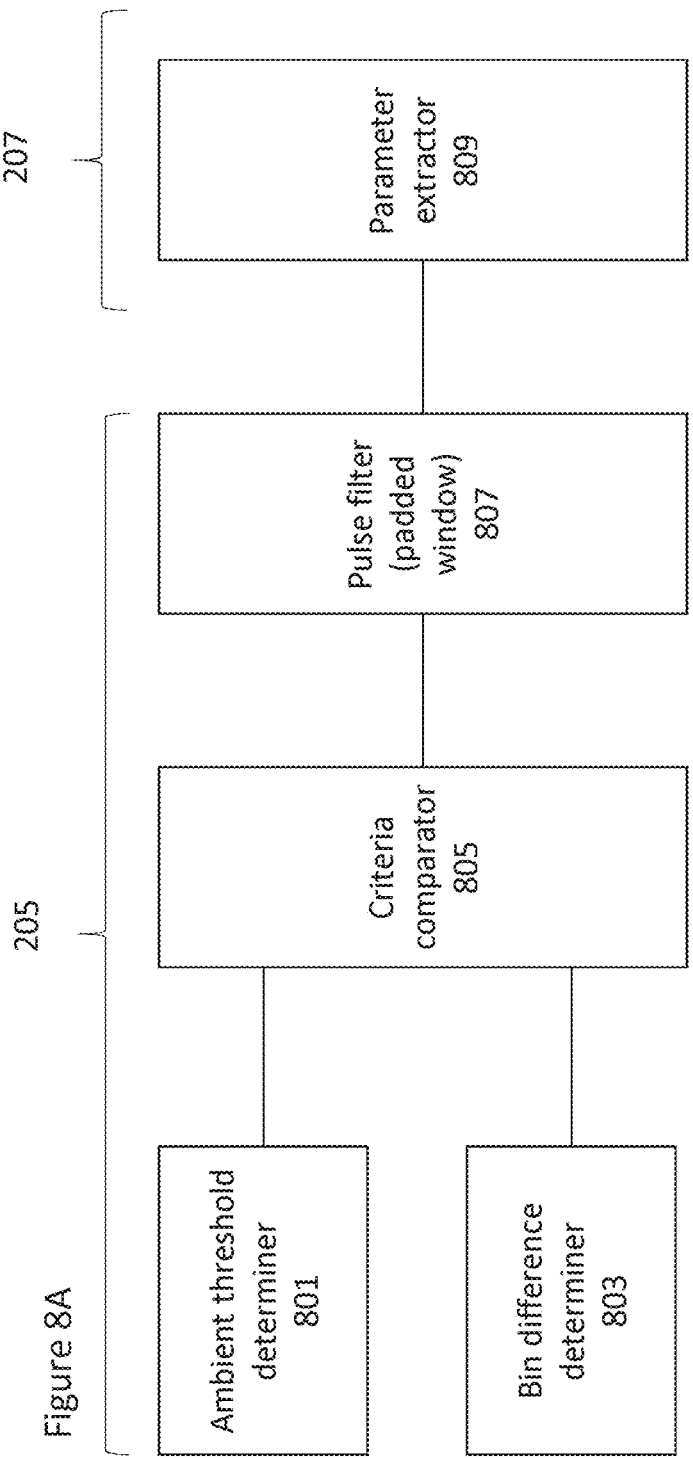
FIG. 8A shows schematically a second example pulse detector and range extractor according to some embodiments.

With respect to FIG. 8A an example pulse detector 205 and parameter extractor 207 suitable for implementing the 'method B' operations is shown.

In some embodiments the pulse detector comprises an ambient threshold determiner 801. The ambient threshold determiner may be configured to receive the output of the cross-talk detector 203 (or the pile-up corrector 201) and be configured to determine an estimate of the ambient light and furthermore identify histogram areas of interest relative to the ambient light values. In some embodiments the output of the ambient threshold determiner 801 can be passed to the criteria comparator 805. In some embodiments an estimate of ambient noise per bin value may be performed by applying an 'ambient window'. The term 'ambient window' represents a time when the received signal is accumulated no optical output made from the device: the name is due to the signal received being from ambient light. Dark signal from the photodetector will also be accumulated during this period: this can be considered in the same way as ambient light. Typically the time allocated to the ambient window may equate to the time allocated to 8 bins of the full histogram, in order to minimize the effect of shot noise in the window. While a perfectly accurate mean would require an infinite number of samples, the ambient window can provide an estimate with sufficient accuracy to prevent error.

For a system where the noise performance is dominated by the photon shot noise of events falling in a given window, the standard deviation of the noise can be estimated by the square root of the mean number of events. This noise estimate can be multiplied by factor to reduce the likelihood of false targets being detected by the system. One example is to multiply this noise estimation by 6. This ambient noise threshold seeks to account for noise both in the ambient window itself and noise from the captured histogram. This threshold may then be applied to the bin difference values to determine pulses.

In other words if we define sigma as the Photon Shot noise=sqrt(events), then sqrt(ambient_events_per_bin)=ambient sigma. Thus an equation for ambient thresholding may be defined as Ambient threshold=ambient_events_per_bin+sqrt (ambient_events_per_bin)*sigma—thres For example where ambient events_per_bin=50 and the ambient shot noise (sigma)=sqrt(50)=7.7 and sigma_thres=6.0, then ambient thresh=50+7.0*7.7=99 events.

In some embodiments the pulse detector furthermore comprises a bin difference determiner 803. The bin difference determiner 803 is configured to analyze the histogram data to generate outputs which are further analyzed by the criteria comparator 805. This for example may be performed by generating a value for each bin which is the bin count minus the previous bin value. In some embodiments the difference value may be rolling window of +/−n bins.

The output of the bin difference determiner 803 may be passed to the criteria comparator 805.

In some embodiments the pulse determiner comprises a criteria comparator 805 where the results of the bin difference determiner 803 and the ambient threshold determiner 801 is analyzed to identify whether the area of interest of the histogram is part of a detected signal pulse. In some embodiments the criteria comparator 805 is configured to determine the start, center and end bins of potential pulses based on comparing the bin difference and ambient threshold values. The criterial may pass these values and the histogram data to a pulse filter 807.

In some embodiments the pulse determiner comprises a pulse filter 807 configured to filter the histogram data based on the output from the criteria comparator 805. Thus in some embodiments for each potential pulse start and end position a pulse window may be generated and the histogram bins filtered using this pulse window filter. In some embodiments the bins outside of the pulse window are padded by a determined ambient value. Furthermore in some embodiments based on the knowledge of the VCSEL pulse width then parameter estimation window(s) within each detection window may be generated. The output of the pulse filter 807 may be passed to a parameter extractor 807.

The parameter extractor 807 may then be configured to determine the parameters associated with the filtered pulse value (for example, determine the range/max range/noise parameters using the parameter estimation window(s) within each pulse window).

Figure 8B:
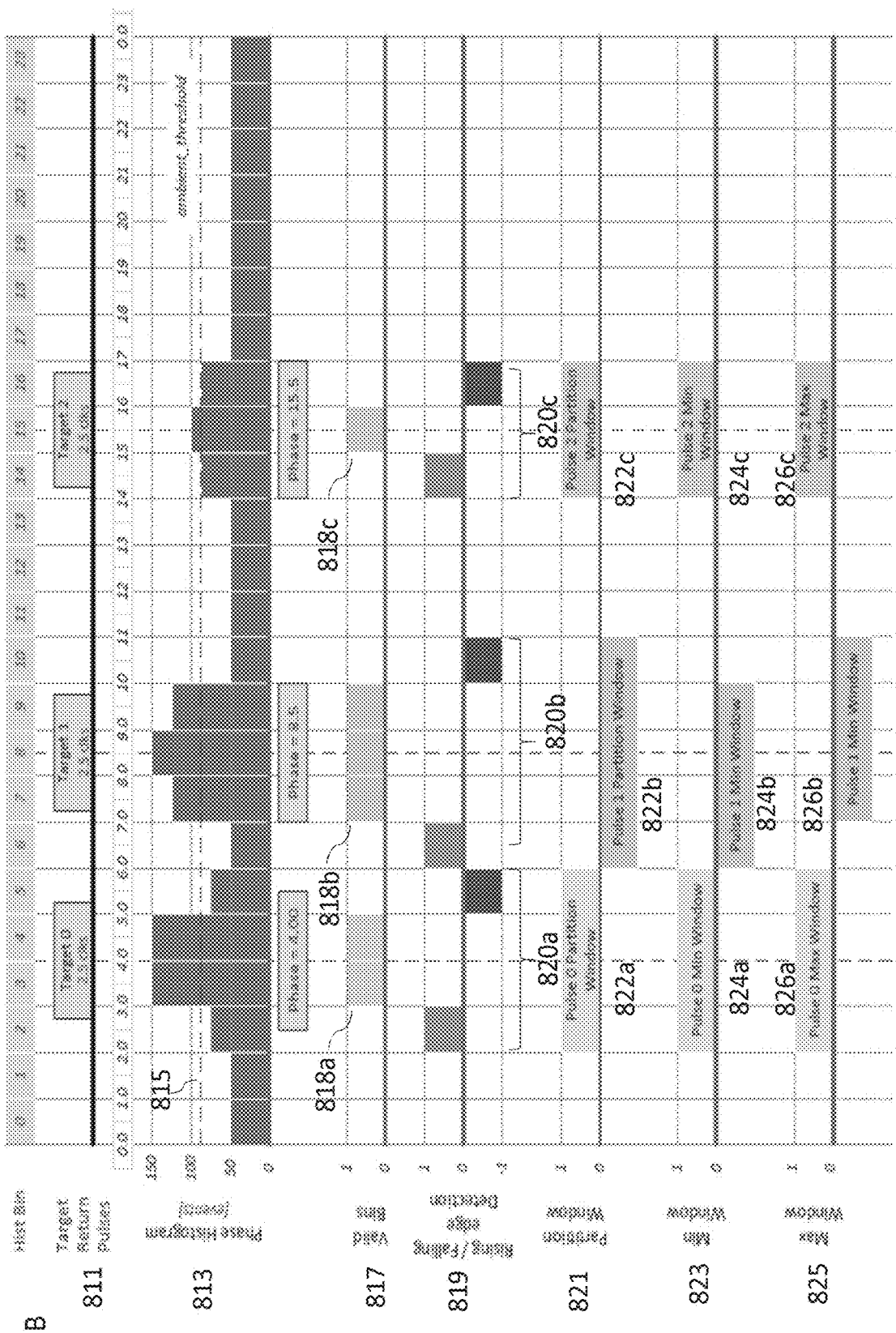
FIG. 8B shows a simulated three object example and the operation of the second example pulse detector.
Figure 8C:
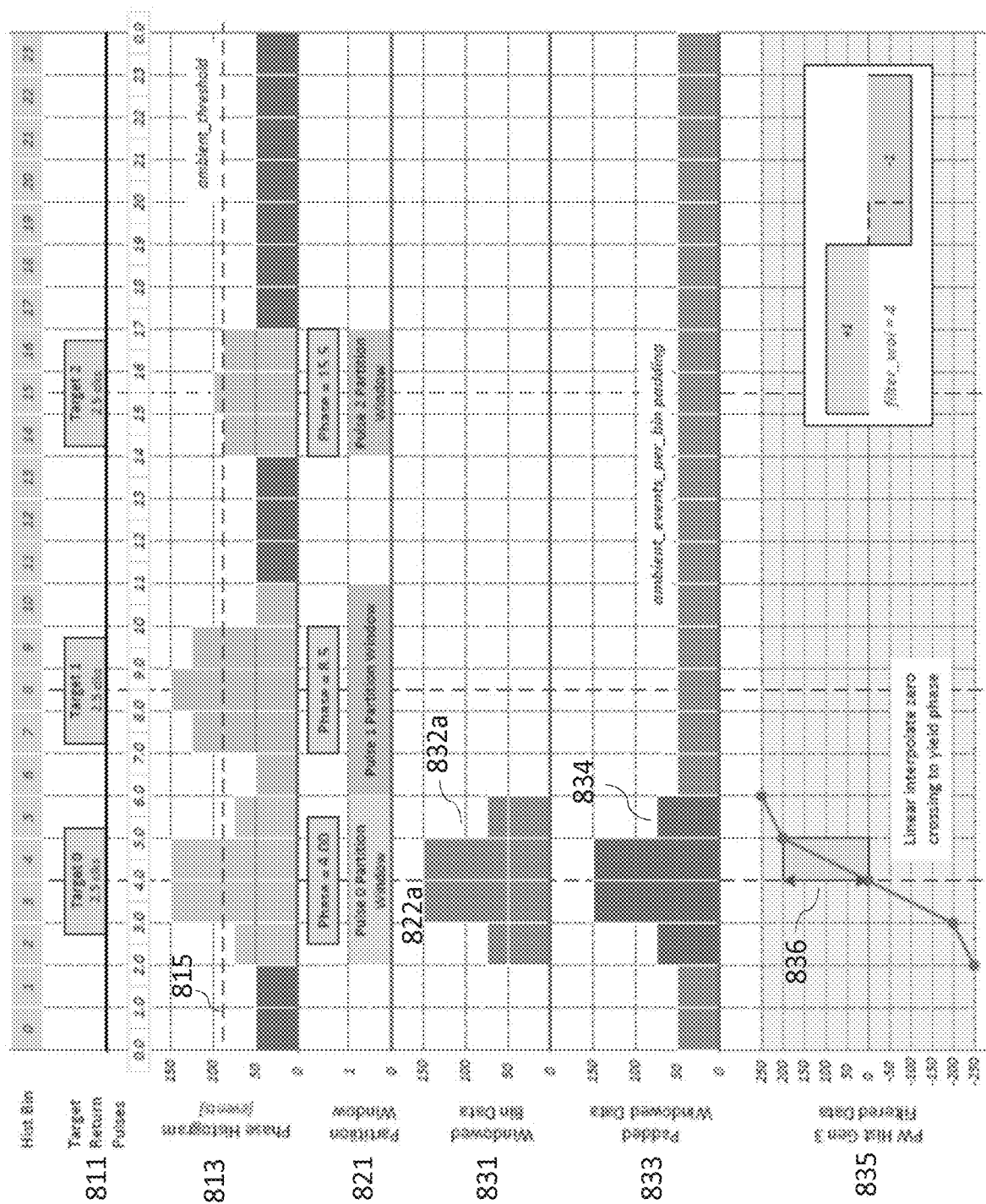
FIG. 8C shows the simulated three object example and the operation of the second example range extractor for the first object.
Figure 8D:
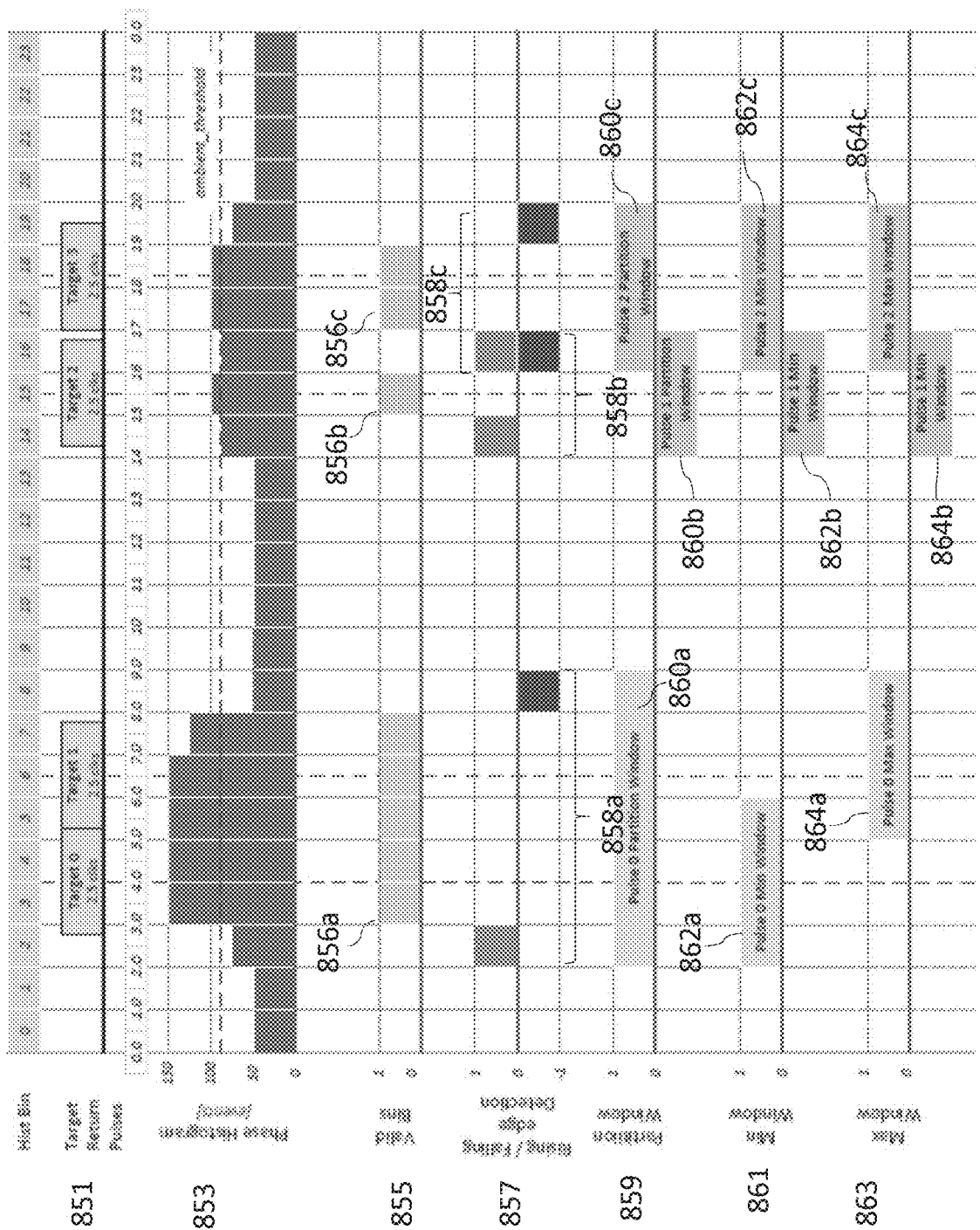
FIGS. 8D to 8F show further simulated multiple object examples of the operation of the second example pulse detector.
Figure 8E:
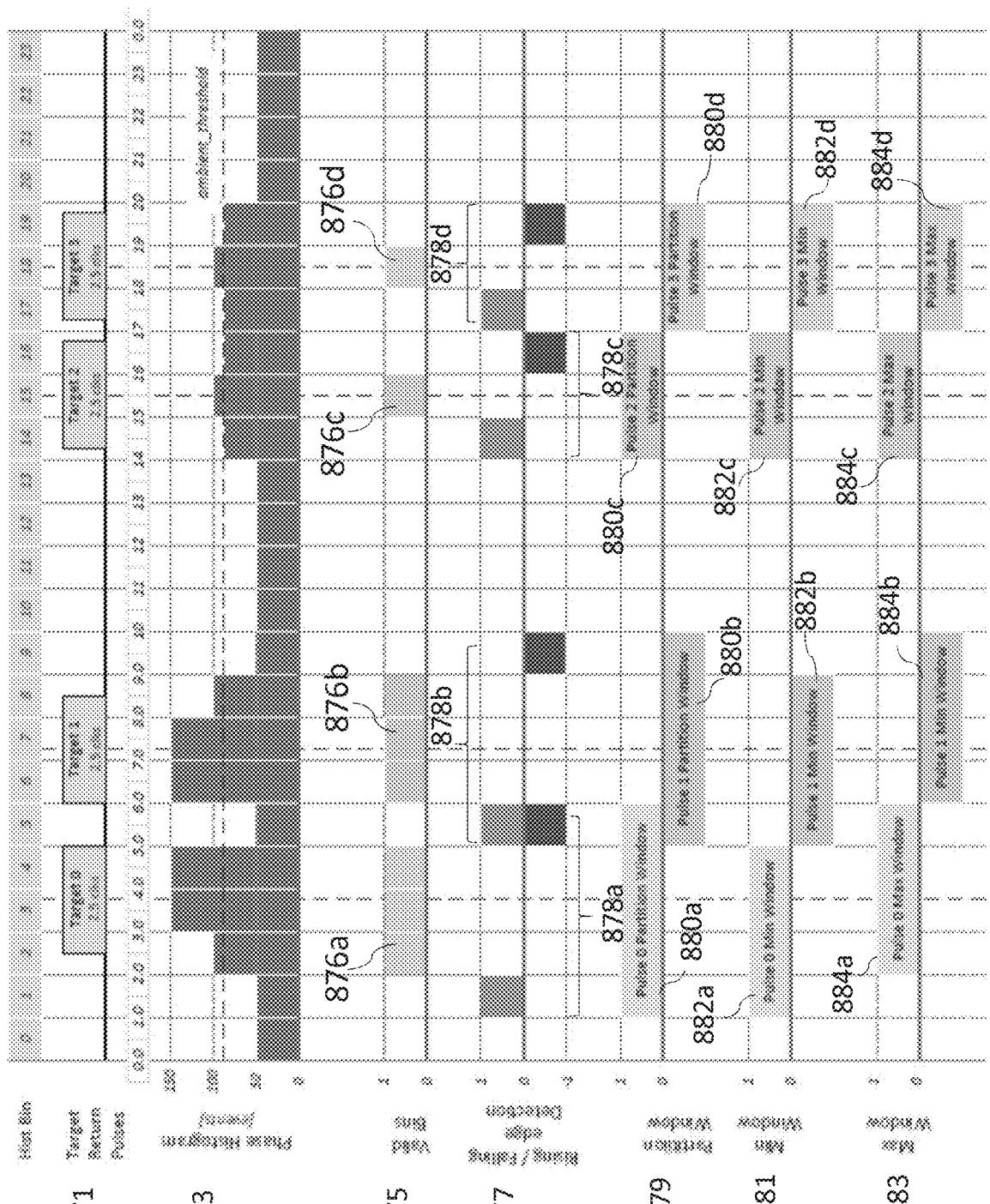
Figure 8F:
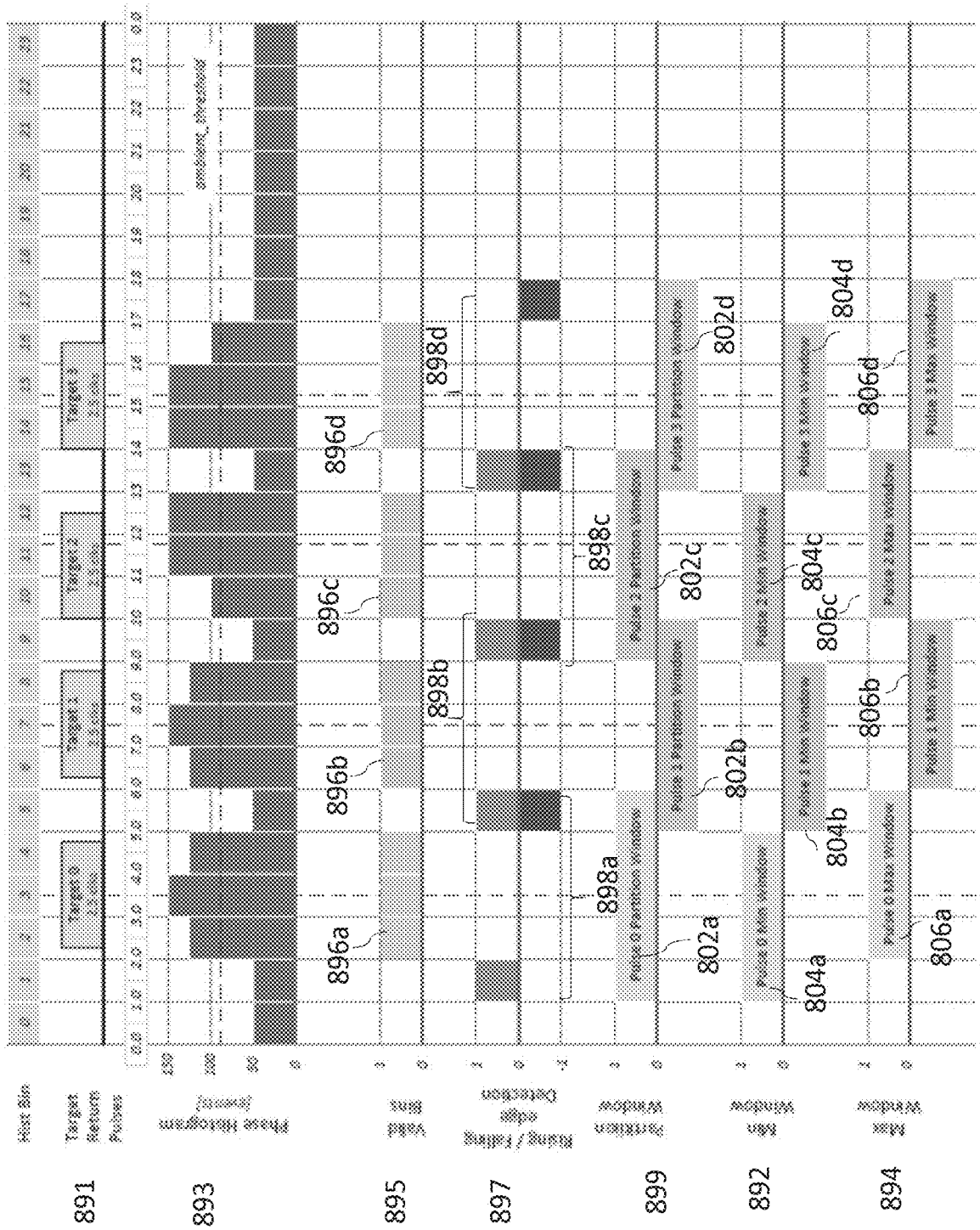
Figure 8G:
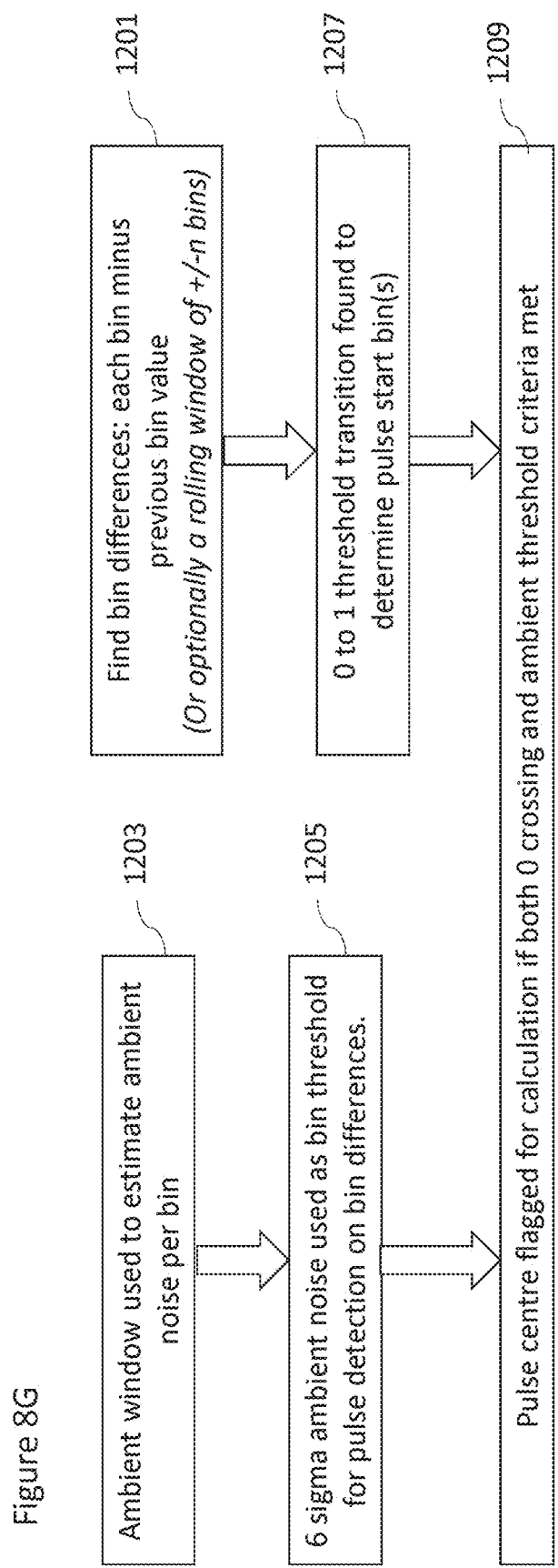
FIG. 8G shows a flow diagram of the operation of the second example pulse detector and range extractor as shown in FIG. 8A.

With respect to FIG. 8G an example flow diagram showing the operation of the apparatus shown in FIG. 8A according to some embodiments is shown.

In some embodiments an ambient window is used to estimate ambient noise per bin. The operation of using an ambient window used to estimate ambient noise per bin is shown in FIG. 8G step 1203.

Having determined the ambient noise per bin a bin threshold for pulse detection is determined, for example using the 6 sigma ambient noise value. The operation of determining a bin threshold for pulse detection using the 6 sigma ambient noise value is shown in FIG. 8G by step 1205.

Furthermore bin differences are determined, for example by using each bin minus previous bin value (or optionally a rolling window of +/−n bins). The operation of determining bin differences for example by using each bin minus previous bin value is shown in FIG. 8G by step 1201.

Having determined bin differences the positive edge may be indicated by determining positive bin differences.

Furthermore in some embodiments having determined the bin differences potential pulse start bins may be indicated. In some embodiments these are further filtered by bin differences being positive and being above the ambient noise value.

The operation of determining pulse start positions is shown in FIG. 8G by step 1207

Furthermore the pulse center may be flagged for calculation if both zero crossing and ambient criteria are met. The operation of flagging the pulse center for calculation if both zero crossing and ambient criteria are met is shown in FIG. 8G by step 1209.

Figure 9:
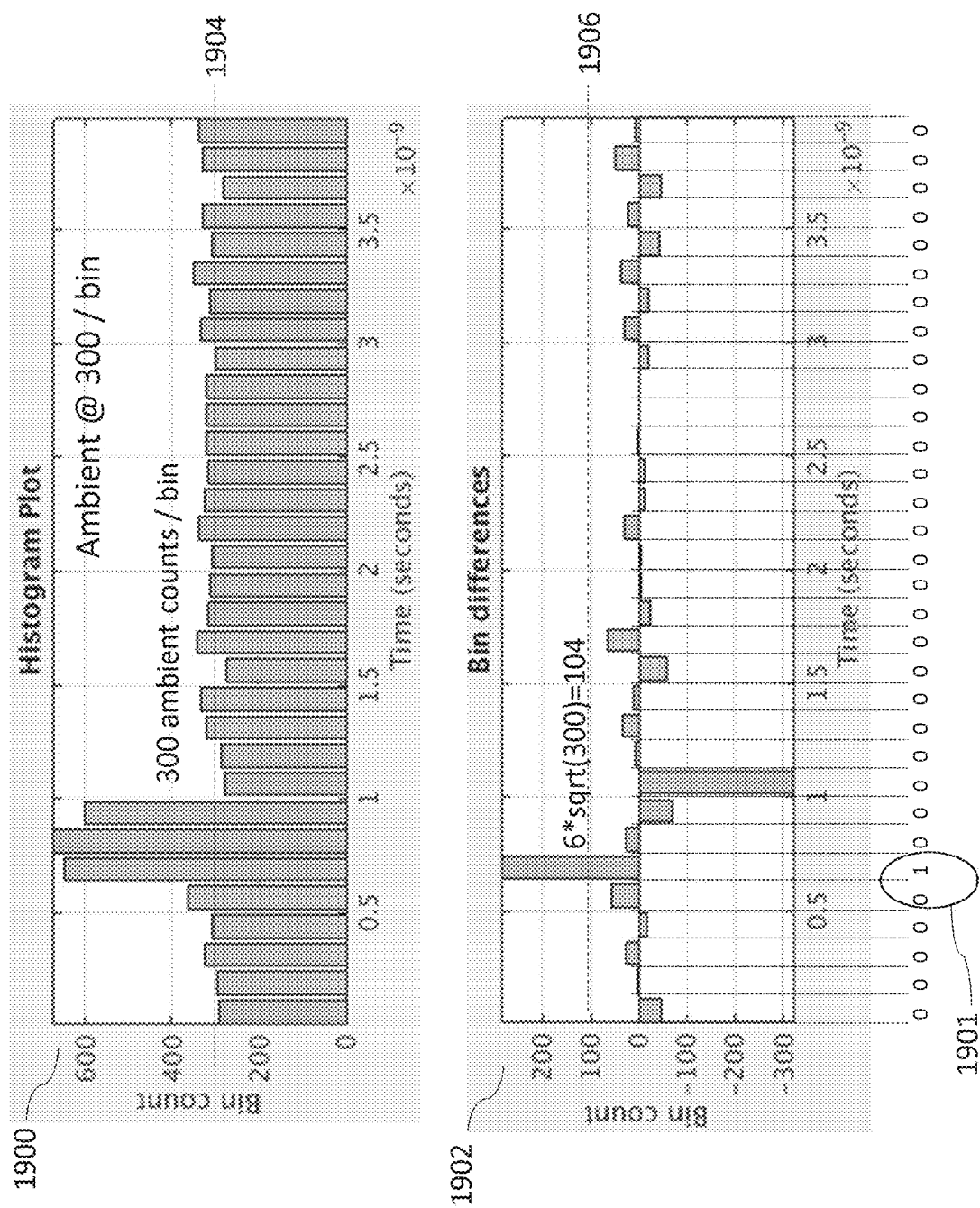
FIG. 9 shows an example histogram plot and bin differences produced using the method shown in FIG. 8G.

With respect to FIG. 9 an example of the application of the method shown in FIG. 8G is described in further detail. In the top part of FIG. 9 is shown a histogram plot 1900 showing bin counts. From these bin counts a bin difference value may be calculated and plotted 1902 as shown in the bottom part of FIG. 9.

The ambient count per bin may furthermore be determined as shown in the top part of FIG. 9 by the horizontal dashed line 1904 at 300 ambient counts per bin. The 6 sigma value of the ambient count per bin (i.e., 6*sqrt(ambient)) may be determined and is shown in the bottom part of FIG. 9 as dashed line 1906 at 104 counts.

Where the bin difference value is greater than the ambient threshold value then the start bin of the pulse has been determined. This is shown in the bottom part of FIG. 9 wherein a bit sequence 1901 is shown where each bin has an associated bit value which is 1 when the bin difference value is greater than the threshold value of 104 and 0 otherwise.

In some embodiments rather than applying the ambient threshold to the bin difference the ambient threshold is used to determine a potential pulse start position against the bin values. For example FIG. 8B shows a simulated three object example and the operation of the second example pulse detector where the ambient threshold is applied to the bin value to determine an initial pulse candidate. In this example there is shown a first plot 811 which shows the target return pulses. Furthermore is shown a plot of the phase histogram 813 and the determined ambient threshold 815. FIG. 8B furthermore shows a threshold valid bin determination plot 817 on which is shown the detection of bins which meet the ambient criteria shown as bin pulses 818a, 818b, and 818c. These ambient criteria valid plots may furthermore be extended by a bin either side as shown in rising/falling edge plot 819 showing the extended pulse detection windows 820a, 820b, and 820c. The thresholded data thus provides an initial estimate of pulses widths with the caveat that the ambient filtering can miss some of the lower pulse bin values. This is why in some embodiments the detected pulse width is expanded by 1 bin on each side which allows the width of the pulse to be crudely estimated and an extended pulse identified.

Additionally shown in FIG. 8B is the partition window plot 821 showing partitions 822a, 822b, and 822c. The partition windows furthermore may be split into min window plots 823 (showing min windows 824a, 824b, and 824c) and max window plots 825 (showing max windows 826a, 826b, and 826c). Having expanded the detected pulse widths by 1 in each direction to ensure that the pulse is fully enclosed by the partition window the partition window width defines the filter half width for the range extraction. In some embodiments it may be required to set a lower bound on the pulse partition window width. The min window which is the first 4 bins of the partition window (3 if partition window<4) is used to estimate the min phase/range of the pulse and the last 4 bins of the partition window (3 if partition window<4) may be used to estimate the max phase/range of the pulse.

FIG. 8C shows an example pulse filtering such as performed by a pulse filter 807 in some embodiments. The pulse filter may be configured to filter the histogram data based on the output from the criteria comparator 805. FIG. 8C shows the plot 811 which shows the target return pulses, the phase histogram 813 plot and the determined ambient threshold 815, and partition window plot 821 showing partition 822a.

As can be shown in FIG. 8C the pulse filter may be configured to apply the partition window 822a to the histogram phase plot 813 to generate the windowed plot 831 showing the pulse 832a. Furthermore the pulse filter may pad the remainder of the histograms with the ambient events per bin padding value. This is shown in FIG. 8C by plot 833 which shows the pulse 834 surrounded by the padding values. FIG. 8C furthermore shows an example linear interpolation method for determining the range phase value which may be implemented by using the min/max windows as shown in FIG. 8B.

FIG. 8D shows a further example of the operation of the second pulse detector. In this example there is shown a first plot 851 which shows four target return pulses. Furthermore is shown a plot of the phase histogram 853 and the determined ambient threshold. FIG. 8D furthermore shows a threshold valid bin determination plot 855 on which is shown the detection of pulses 856a (which is actually the detection of 2 close pulse returns), 856b, and 856c. These ambient valid plots may furthermore be extended by a bin either side as shown in rising/falling edge plot 857 showing the extended pulse detection windows 858a, 858b, and 858c. Additionally is shown the partition window plot 859 showing partitions 860a, 860b, and 860c. The partition windows furthermore may be split into min window plots 861 (showing min windows 862a, 862b, and 862c) and max window plots 863 (showing max windows 864a, 864b, and 864c). As can be seen by applying the min and max windows (where there is knowledge of the actual pulse length) the range associated with the two target pulses may be extracted using the min and max window plots applied to the partition window filtering of the histogram bins.

FIG. 8E shows another example of the operation of the second pulse detector. In this example there is shown a first plot 871 which shows four target return pulses. Furthermore is shown a plot of the phase histogram 873 and the determined ambient threshold. FIG. 8E furthermore shows a threshold valid bin determination plot 875 on which is shown the detection of pulses 876a, 876b, 876c, and 876d. These ambient valid plots may furthermore be extended by a bin either side as shown in rising/falling edge plot 877 showing the extended pulse detection windows 878a, 878b, 878c and 878d. Additionally is shown the partition window plot 879 showing partitions 880a, 880b, 880c and 880d. The partition windows furthermore may be split into min window plots 881 (showing min windows 882a, 882b, 882c and 882d) and max window plots 883 (showing max windows 884a, 884b, 884c and 884d).

FIG. 8F shows another example of the operation of the second pulse detector. In this example there is shown a first plot 891 which shows four target return pulses. Furthermore is shown a plot of the phase histogram 893 and the determined ambient threshold. FIG. 8F furthermore shows a threshold valid bin determination plot 895 on which is shown the detection of pulses 896a, 896b, 896c, and 896d. These ambient valid plots may furthermore be extended by a bin either side as shown in rising/falling edge plot 897 showing the extended pulse detection windows 898a, 898b, 898c and 898d. Additionally is shown the partition window plot 899 showing partitions 802a, 802b, 802c and 802d. The partition windows furthermore may be split into min window plots 892 (showing min windows 804a, 804b, 804c and 804d) and max window plots 894 (showing max windows 806a, 806b, 806c and 806d).

Figure 10:
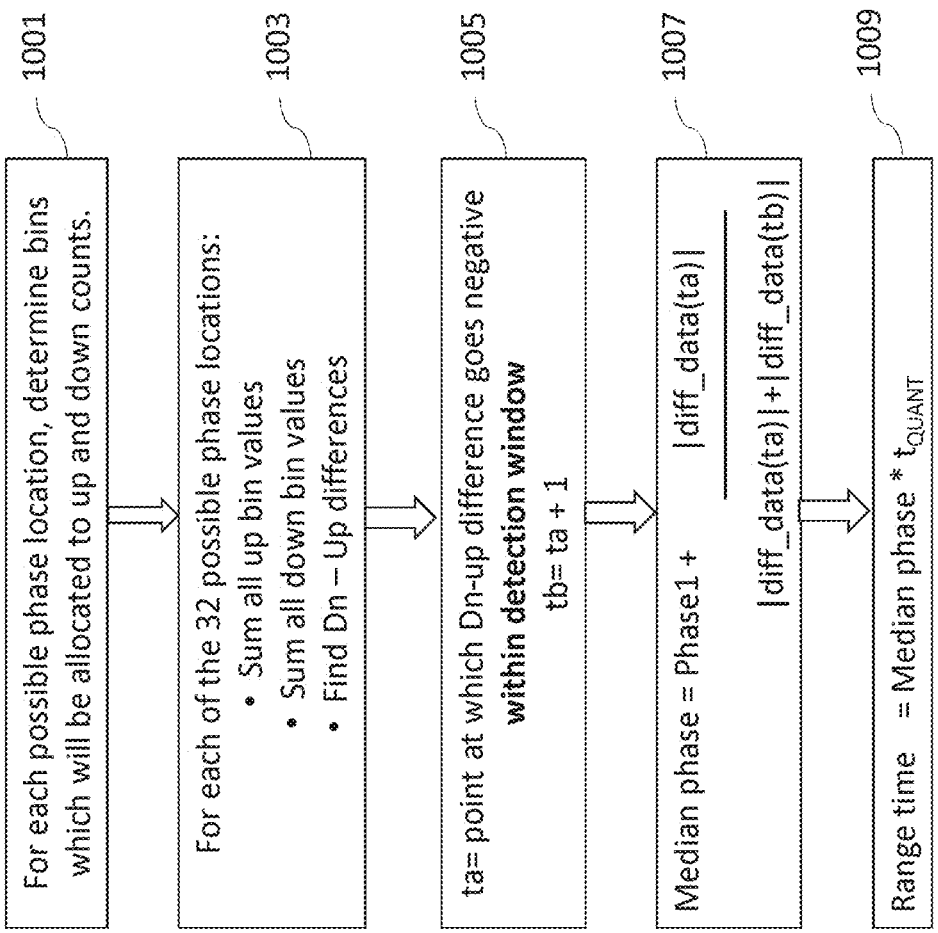
FIG. 10 shows a flow diagram of a further example of range extraction by median determination method according to some embodiments.

With respect to FIG. 10 an example flow diagram showing the operation of determining a range value within the parameter extractor following the detection and filtering operations described above is shown.

As has been described above for each possible phase location an allocation of up and down bins is made in order to calculate bin differences.

The operation of generating the allocation of up and down bins for each possible phase location is shown in FIG. 10 by step 1001.

Having determined the detection windows (the up and down bins) then for each of the possible phase locations (in this example 32 bins within the histogram) the up bin values are summed, the down bin values are summed and then the bin difference (down sum-up sum difference) is determined.

The operation of determining the down sum-up sum difference (which may be defined as the value diff_data) for each of the possible phase locations is shown in FIG. 10 by step 1003.

Having determined the bin difference values the point at which the difference goes negative is determined (and may be defined as bin ta) furthermore the next bin phase (defined as tb) is also identified.

The identification of the bin phases where the difference goes negative (and the succeeding bin) is shown in FIG. 10 by step 1005.

The median phase value may then be determined based on the detected start bin defined as phase 1 (the value of phase 1 may be determined from the detection operations described above may be determined by a bin difference value being greater than an ambient threshold value) and the following:

Median phase=Phase1+(|diff_data(ta)|/|diff_data(ta)|+|diff_data(tb)|)

The operation of determining the median phase is shown in FIG. 10 by step 1007.

Furthermore the range time may then be determined by multiplying the median phase value with the quantization time $t_{quant}$ or in other words Range time=Median phase*$t_{QUANT}$ The application of this method can be shown for example in FIG. 11 which shows for an example 32 bin histogram plot where the first three of 32 allocations of up bins, down bins and unused bins are shown. Thus the first allocation where the phase is at the start of bin 1 is such that the first allocation 1101 shows the down bins are bins 25 to 32, the up bins are 1 to 8. The second allocation 1103 shows the down bins are bins 26 to 32 and 1, the up bins are 2 to 9. The third allocation 1105 shows the down bins are bins 27 to 32 and 1 to 2, the up bins are 3 to 10.

Thus from the histogram plot 1107 the up-down window differences may be determined and plotted 1109 which would enable a pulse to be detected (from the difference values being greater than the threshold) and furthermore from the zero-crossover detection.

It should be appreciated that the device may be any suitable device. By way of example only and without limitation, that device may be a mobile telephone, smart phone, tablet, computer, measuring device, switch controller such as for a light, controlling a water supply such as in a tap or toilet, door controller, distance sensor, impact controller, or any other suitable device.

Some embodiments may use other sensors, instead of SPADs. These sensors may be integrating elements generating events on reception of the light information. Some embodiments may use any photon sensitive detector.

Some embodiments may have infrared applications. The light source would be replaced by an infrared source and the detector array would be sensitive to infra-red radiation.

It should be appreciated that the above described arrangements may be implemented at least partially by an integrated circuit, a chip set, one or more dies packaged together or in different packages, discrete circuitry or any combination of these options.

For example, the detector and optionally the processor may be provided on an integrated circuit or die. The detector and optionally the processor may be packaged in a module with the light emitter.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. A method for determining a range using a detector sensor, the method comprising:
    sending a light signal to an object within a field-of-view of the detector sensor;
    receiving a reflected light pulse with the detector sensor;
    receiving histogram data from the detector sensor based on a plurality of histogram bin values, the histogram data comprising at least one pulse, the at least one pulse comprising at least one bin of the histogram data;
    detecting, from the histogram data, a width or a position of the at least one pulse, wherein detecting a width or a position of the at least one pulse comprises determining at least one histogram position associated with a start of the at least one pulse, and wherein determining at least one histogram position associated with a start of the at least one pulse comprises at least one of:
        applying a phase weighted filter to the histogram data to determine at least one histogram position where the phase weighted filter output is greater than an ambient level threshold value;
        applying a window of events to the histogram data to determine at least one histogram position and determining where an output of the window of events is greater than an ambient level threshold value; and
        applying an edge detecting filter to the histogram data to determine a rising or falling edge of the at least one pulse;
    filtering the histogram data based on the width or position of the detected pulse to generate a pulse histogram suitable for parameter extraction; and
    determining the range to the object based on a parameter extracted from the pulse histogram.

2. The method as claimed in claim 1, wherein the detecting comprises determining at least one histogram position associated with a median of the at least one pulse.

3. The method as claimed in claim 2, wherein determining at least one histogram position associated with a median of the at least one pulse comprises at least one of:
    applying a phase weighted filter to the at least one histogram to determine at least one histogram position where the phase weighted filter output crosses zero following at least one earlier phase weighted filter output is greater than an ambient level threshold value;
    applying a phase weighted filter to the at least one histogram, the phase weighted filter comprising a first part, a second part and a third part;
    generating a first difference value based on the sum of the first part, the second part and a negative third part; and
    generating a second difference value based on the sum of the second part, the third part and a negative first part.

4. The method as claimed in claim 3, wherein determining at least one histogram position associated with a median of the at least one pulse comprises:
    determining at least one histogram position where the first difference value and the second difference value are greater than zero and at least one earlier phase weighted filter output is greater than an ambient level threshold value, or determining the first difference value is less than zero and the second difference value is greater than zero and a following histogram position produces a first difference value which is less than zero and a second difference value which is greater than zero and the second difference value are greater than zero and at least one earlier phase and at least one earlier phase weighted filter output is greater than an ambient level threshold value.

5. The method as claimed in claim 1, wherein the detecting comprises determining a one of a median and end position of the at least one pulse by:
    determining an ambient level for the histogram;
    generating from the ambient level an ambient level threshold value; and at least one of:
        determining the median position of the at least one pulse following the start position of the at least one pulse from a second histogram data bin difference value zero crossing; and
        determining the end position of the at least one pulse following the start position of the at least one pulse from a third histogram data bin value or histogram data bin difference value with a magnitude greater than the ambient level threshold value.

6. The method as claimed in claim 5, wherein generating from the ambient level comprises generating a value defined by
    a determined number times a square root of the ambient level value.

7. The method as claimed in claim 5, wherein generating from the ambient level comprises generating a value defined by
    6 times the square root of the ambient level value.

8. The method as claimed in claim 5, wherein generating from the ambient level comprises generating a value defined by
    a determined offset value applied to a determined number times a square root of the ambient level value.

9. The method as claimed in claim 1, wherein the filtering comprises padding histogram data bins other than those within the detected pulse with an ambient level.

10. The method as claimed in claim 1, wherein the detector sensor comprises a single photon avalanche diode sensor.

11. The method as claimed in claim 1, wherein the detecting comprises detecting the width and the position of the at least one pulse and the filtering includes filtering the histogram data based on the width and position of the detected pulse.

12. An apparatus for measuring a distance to an object, the apparatus comprising:
- a light source configured to send a light signal to an object;
- a detector sensor configured to receive a reflected light signal from the object;
- a pulse detector configured to receive histogram data from the detector sensor based on a plurality of histogram bin values, the histogram data comprising at least one pulse and further configured to detect from the histogram data a width or a position of the at least one pulse, the at least one pulse comprising at least one bin of the histogram data;
- a pulse filter configured to filter the histogram data based on the width or the position of the detected pulse to generate a pulse histogram suitable for parameter extraction, wherein the pulse filter comprises a window of events configured to be applied to the at least one histogram to determine at least one histogram position where an output of the window of events is greater than an ambient level threshold value; and
- a range extractor configured to determine a range to the object within a field-of-view of the detector sensor based on a parameter extracted from the pulse histogram.

13. The apparatus as claimed in claim 12, wherein the pulse detector is configured to determine at least one histogram position associated with a start of the at least one pulse.

14. The apparatus as claimed in claim 13, wherein the pulse detector further comprises at least one of:
- a phase weighted filter configured to be applied to the at least one histogram to determine at least one histogram position where the phase weighted filter output is greater than an ambient level threshold value; and
- an edge detecting filter configured to be applied to the at least one histogram to determine a rising or falling edge.

15. The apparatus as claimed in claim 12, wherein the pulse detector is configured to determine at least one histogram position associated with a median of the at least one pulse.

16. The apparatus as claimed in claim 15, wherein the pulse detector comprises at least one of:
- a phase weighted filter configured to apply to the at least one histogram to determine at least one histogram position where the phase weighted filter output crosses zero following at least one earlier phase weighted filter output is greater than an ambient level threshold value;
- a phase weighted filter configured to apply to the at least one histogram, the phase weighted filter comprising a first part, a second part and a third part;
- a difference value generator configured to generate a first difference value based on the sum of the first part, the second part and a negative third part, and to generate a second difference value based on the sum of the second part, the third part and a negative first part; and
- a comparator configured to determine at least one histogram position where the first difference value and the second difference value are greater than zero and at least one earlier phase weighted filter output is greater than an ambient level threshold value, or determining the first difference value is less than zero and the second difference value is greater than zero and a following histogram position produces a first difference value which is less than zero and a second difference value which is greater than zero, and the second difference value are greater than zero and at least one earlier phase and at least one earlier phase weighted filter output is greater than an ambient level threshold value.

17. The apparatus as claimed in claim 12, wherein the pulse detector is configured to determine a one of a start, median and end position of the at least one pulse, the pulse detector comprising:
- an ambient level threshold determiner configured to determine an ambient level for the histogram and to generate from the ambient level an ambient level threshold value; the pulse detector further comprising at least one of:
  - a pulse start determiner configured to determine the start position of the at least one pulse from a first histogram data bin value or histogram data bin difference value with a magnitude greater than the ambient level threshold value;
  - a pulse median determiner configured to determine the median position of the at least one pulse following the start position of the at least one pulse from a second histogram data bin difference value zero crossing; and
  - a pulse end determiner configured to determine the end position of the at least one pulse following the start position of the at least one pulse from a third histogram data bin value or histogram data bin difference value with a magnitude greater than the ambient level threshold value.

18. The apparatus as claimed in claim 12, wherein the detector sensor is a single photon avalanche diode sensor.

19. The apparatus of claim 12, further comprising a pile-up corrector, the pile-up corrector being configured to receive the histogram data from the detector sensor and correct pile-up errors in the histogram data.

20. The apparatus of claim 19, further comprising a cross-talk detector, the cross-talk detector being configured to:
- receive the histogram data from the pile-up corrector;
- determine whether the output comprises cross-talk components and, if the cross-talk components are present, at least partially remove the cross-talk components; and
- provide corrected histogram data to the pulse detector.

* * * * *